United States Patent [19]

Cates et al.

[11] Patent Number: 5,204,517
[45] Date of Patent: Apr. 20, 1993

[54] METHOD AND SYSTEM FOR CONTROL OF A MATERIAL REMOVAL PROCESS USING SPECTRAL EMISSION DISCRIMINATION

[75] Inventors: Michael C. Cates, Solana Beach; Richard R. Hamm; John D. Hoogerwerf, both of San Diego, all of Calif.

[73] Assignee: Maxwell Laboratories, Inc., San Diego, Calif.

[21] Appl. No.: 813,865

[22] Filed: Dec. 24, 1991

[51] Int. Cl.$^5$ .............................................. G01J 1/32
[52] U.S. Cl. ................................. 250/205; 219/121.62
[58] Field of Search ............................... 250/205, 226; 219/121.62, 121.61, 121.68, 121.69, 121.85; 356/326, 328; 73/655

[56] References Cited

U.S. PATENT DOCUMENTS

| | | | |
|---|---|---|---|
| 3,700,850 | 10/1972 | Lumley et al. | 219/121 |
| 3,986,391 | 10/1976 | Vahaviolos | 219/121 |
| 4,114,018 | 9/1978 | Von Allmen et al. | 219/121.62 |
| 4,249,956 | 2/1981 | Hartman | 134/7 |
| 4,398,961 | 8/1983 | Mason | 134/19 |
| 4,419,562 | 12/1983 | Jon et al. | 219/130 |
| 4,491,484 | 1/1985 | Williams | 134/4 |
| 4,504,727 | 3/1985 | Melcher et al. | 219/121 |
| 4,543,486 | 9/1985 | Rose | 250/492 |
| 4,588,885 | 5/1986 | Lovoi et al. | 250/226 |
| 4,682,594 | 7/1987 | Mok | 128/303 |
| 4,718,974 | 1/1988 | Minaee | 156/643 |
| 4,731,125 | 3/1988 | Carr | 134/17 |
| 4,737,628 | 4/1988 | Lovoi | 250/226 |
| 4,803,021 | 2/1989 | Werth et al. | 264/25 |
| 4,836,858 | 6/1989 | Reinhart | 134/1 |
| 4,867,796 | 9/1989 | Asmus et al. | 131/1 |
| 4,994,639 | 2/1991 | Dickinson et al. | 219/121 |
| 5,013,366 | 5/1991 | Jackson et al. | 134/1 |
| 5,024,968 | 6/1991 | Engelsberg | 437/173 |
| 5,026,964 | 6/1991 | Somers et al. | 219/121.62 |

OTHER PUBLICATIONS

Klauser, H. E., "Closed-Loop Laser Control System", *IBM Technical Disclosure Bulletin*, 24(9), (Feb. 1882), pp. 4691-4692.

Yaeck, C. E., et al., "Transient Photoacoustic Monitoring of Pulse Laser Drilling", *Appl. Phys. Lett.*, 41(11), (Dec. 1, 1982), pp. 1043-1044.

Schmitz, W. N., "Xenon Flashlamp/$CO_2$ Pellet Blasting or Paint Stripping/Coatings Removal", *Proceedings of the DOD/Industry Advanced Coatings Removal Conference*, San Diego, Calif. (Apr. 30/May 2, 1991) (no page No.).

Cates, M. C., "Modeling of the Flashblast Coating Removal Process", *Proceedings of the DOD/Industry Advanced Coatings Removal Conference*, San Diego, Calif. (Apr. 30-May 2, 1991), pp. 1-13.

*Primary Examiner*—David C. Nelms
*Assistant Examiner*—Que T. Le
*Attorney, Agent, or Firm*—Fitch, Even, Tabin & Flannery

[57] ABSTRACT

A method for removing material from a structure, comprising the steps of: (1) generating a light beam; (2) irradiating the surface material of a structure with the light beam having an intensity sufficient to ablate the surface material and to cause the surface material to generate spectral emission signals having intensities; (3) scanning the structure with the light beam at a scan speed; (4) monitoring the spectral emissions to detect a selected one of the spectral emission signals having a selected wavelength and generating an electronic output signal representative of the intensity of a selected one of the spectral emission signals in response to detecting the selected one of the spectral emission signals; (5) determining an updated scan speed functionally related to the electronic output signal; and (6) directing the scan speed to be equal to the updated scan speed. A second embodiment determines the updated scan speed based on the intensity of spectral emission signals detected during predetermined intervals while the structure is illuminated by the light source. A third embodiment determines an updated scan speed based on the intensity of spectral emission signals resulting from a laser pulse irradiating the structure when the output of the light beam is approximately at a minimum.

44 Claims, 17 Drawing Sheets

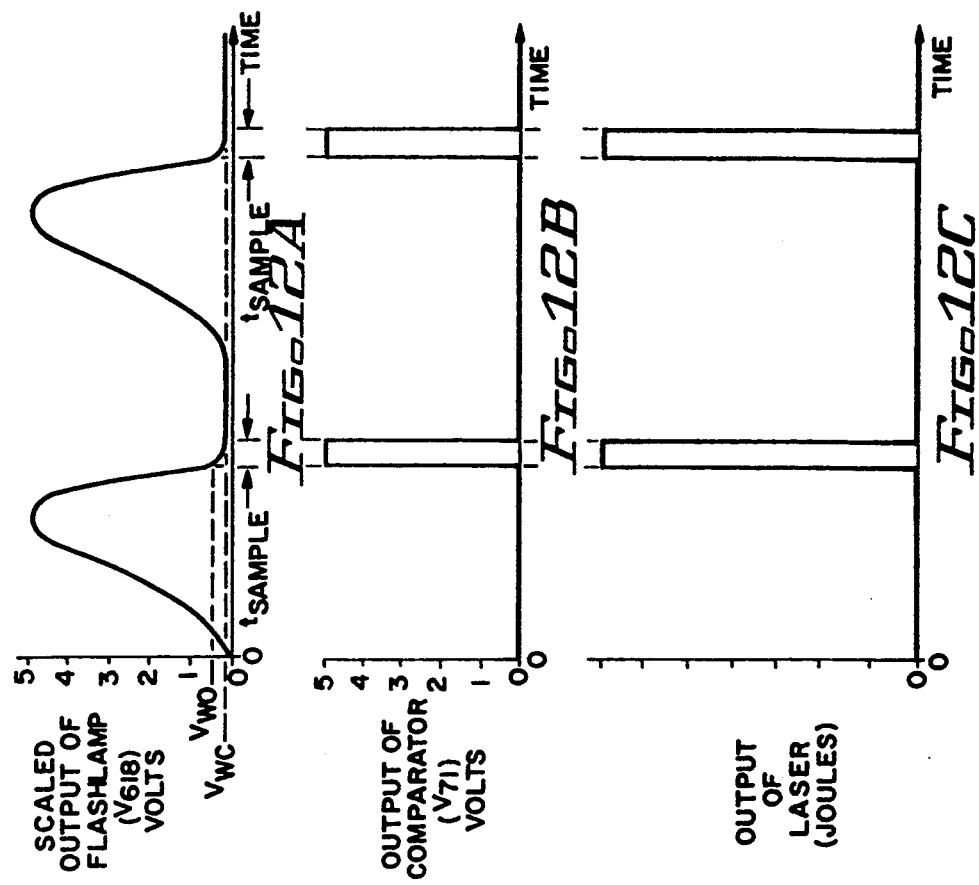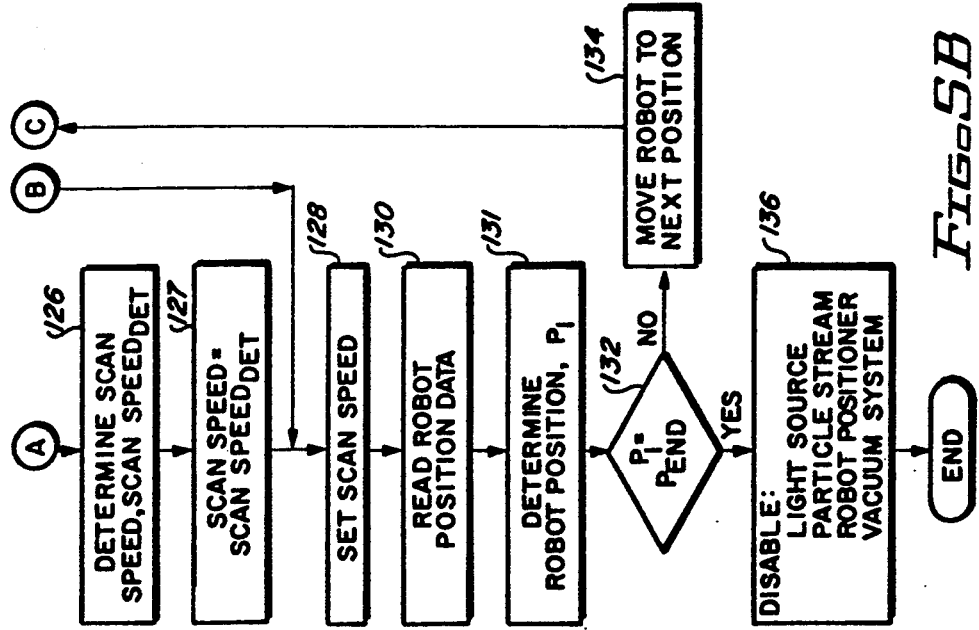

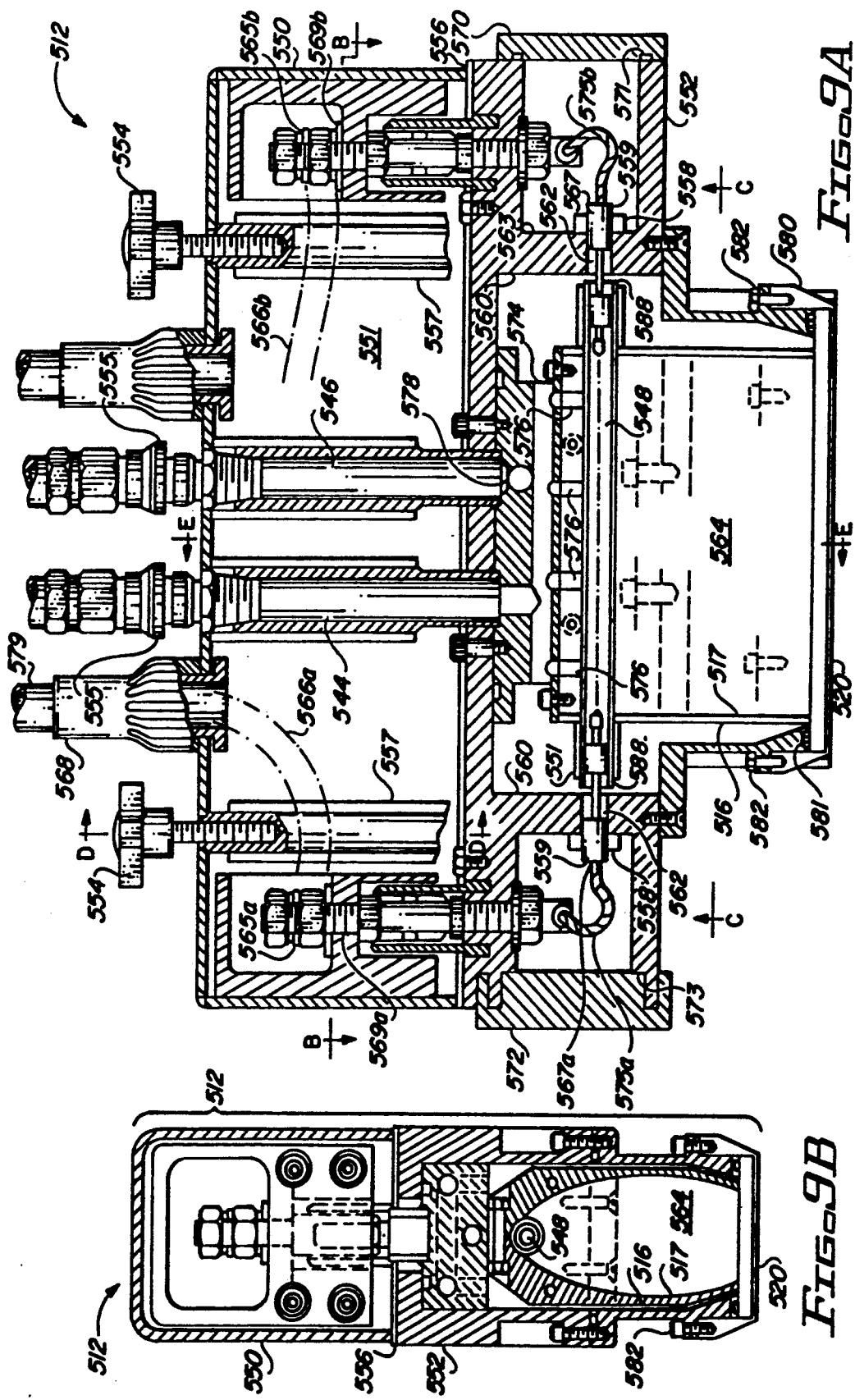

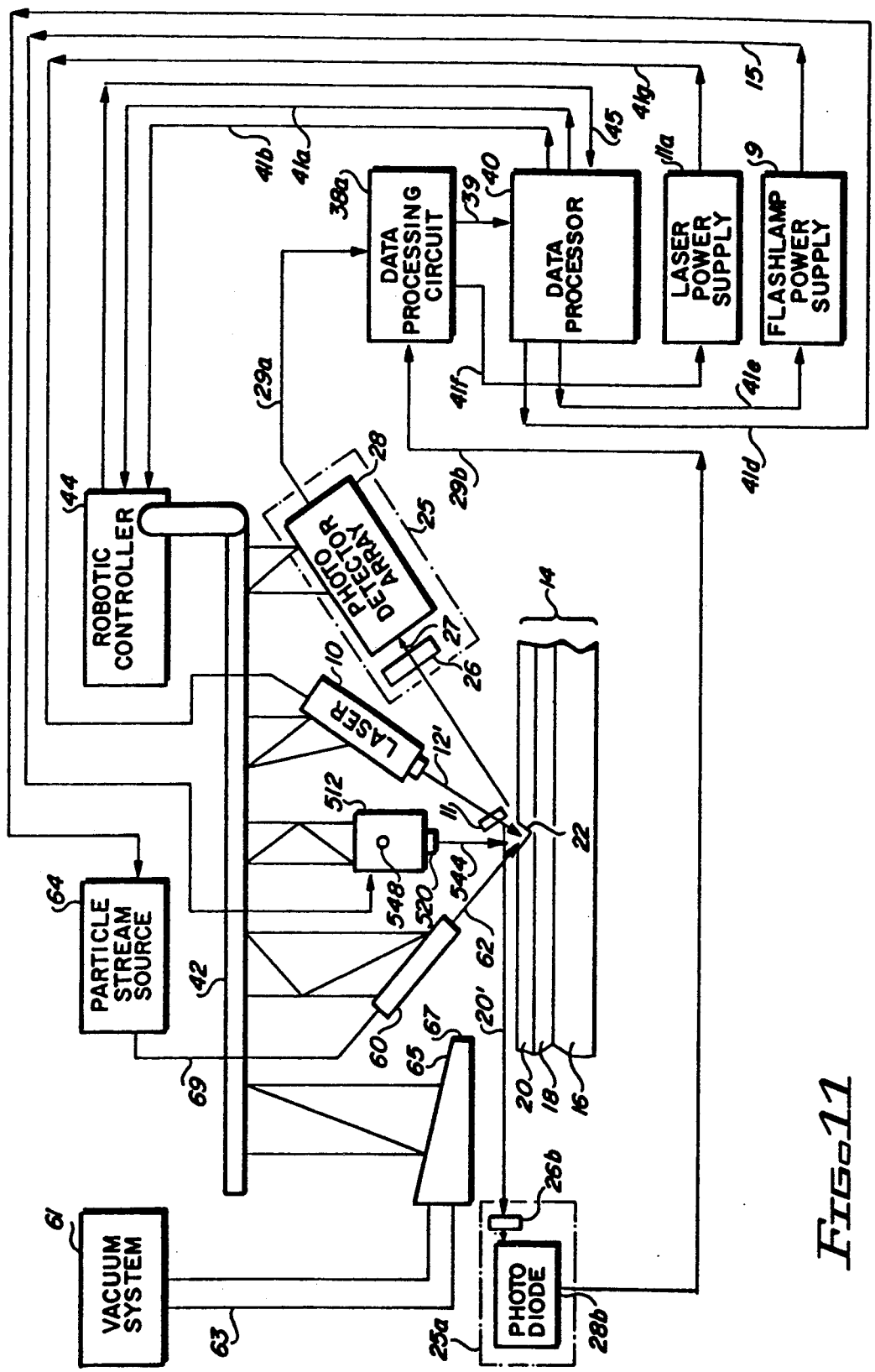

METHOD AND SYSTEM FOR CONTROL OF A MATERIAL REMOVAL PROCESS USING SPECTRAL EMISSION DISCRIMINATION

The present invention relates to a material removal process and system, and more particularly, to a material removal process and system controlled by spectral emissions obtained by irradiating the material with a pulsed light.

BACKGROUND OF THE INVENTION

Material coatings play an important role in our manufactured products based society. Coatings provide immunity to corrosion, thermal insulation, shielding, as well as appearance enhancement, and an aid in identification.

During the life of many manufactured products, such as bridges, aircraft, automobiles, and ships, painted coatings require removal and replacement for a variety of reasons. For example, refurbishment of the paint on aircraft is a regular maintenance item. Commercial airlines repaint their aircraft about every 4-5 years of service. The United States military typically repaints its aircraft after three years of service, or less. Coatings on the exterior surfaces of large ships or bridges require periodic refurbishment in order to prevent or inhibit corrosion.

The removal of paint from the surfaces of aircraft presents special problems. Such surfaces are large, irregularly shaped, and relatively delicate. Because the surfaces of aircraft are typically lightweight aluminum or organically based composite materials, such surfaces and the underlying substrates are particularly susceptible to damage while undergoing paint removal that could degrade their structural integrity.

Many different methods have been used to remove painted coatings. One type, the "particle medium blast" (PMB) method involves impinging the surface to be stripped with particles such as BB's, plastic media, steel shot, wheat starch, and/or sand. However, PMB methods energetic enough by themselves to remove hardened coatings such as paint may damage delicate surfaces such as found on aircraft and automobiles if they are not carefully managed. For example, if the impinging particles dwell too long at one location, the impinged surface may become pitted or stress hardened. This is especially important with regard to the surfaces of aircraft since pitting or stress hardening may change the loading on that portion of the aircraft. PMB may also damage putty joints often found on aircraft between surface plates.

It is also known in the art to apply chemical compounds to painted surfaces in order to chemically breakdown the layers of paint, thereby stripping the paint away from the surface to be exposed. However, such compounds may pose a risk to human health, are usually toxic, and often not biodegradable. Overall, these types of compounds are difficult and costly to dispose of because they present serious environmental problems.

Mechanical paint removal techniques have also been employed. For example, U.S. Pat. No. 4,836,858, entitled "Ultrasonic Assisted Paint Removal Method" discloses a hand held tool which uses an ultrasonic reciprocating edge placed in contact with the surface to be stripped. Unfortunately, employment of this tool is labor intensive and relies upon the skill of a human operator to use it effectively. Further, control of this tool is a problem when applied to aircraft because the aircraft surface may be damaged if there is excessive tool dwell at one location.

Radiant energy paint removal techniques are also known in the art. One such system uses a laser and video frame grabber in a video controlled paint removal system in which paint is stripped from a surface using the output of the laser to ablate the paint while a video camera converts images of the surface being stripped into electronic data signals. The data signals are used to control the laser output. A processor compares the data signals with parameters stored in a memory to determine whether sufficient paint has been removed from the surface being stripped. If an insufficient amount of paint has been removed, then the surface continues being irradiated by the laser. If the irradiated area has been adequately stripped, the processor directs the laser to ablate another area. A significant problem with the video controlled paint removal system is that the amount of data which is generated and which must be processed is enormous. Hence, real time control of video controlled paint removal systems is extremely difficult.

The use of composite structures manufactured, for example, of fiber reinforced epoxy or other thermoset or thermoplastic composites is becoming increasingly common. Many aircraft and automobiles extensively employ plastic composites for surface structures. Such structures are painted for a variety of reasons including aesthetics, identification, and camouflage. However, such painted surfaces deteriorate under the action of weather and the mechanical forces to which they are subjected, thus requiring removal and replacement.

Other than hand sanding, there are no suitable methods for removing paint from the surfaces of such composites. PMB and mechanical grinding methods sufficiently energetic by themselves to remove paint have proven to damage composite materials. The removal of paint with chemical compounds does not offer a satisfactory solution because such chemicals tend to attack the composites, as well as the paint.

For a variety of reasons, paint removal techniques for removing paint from large surfaces, and surfaces having topological anomalies such as rivets, have not proven wholly satisfactory. Thus, it can be appreciated that coating removal, and particularly, the removal of paint from large and often delicate surfaces such as found on aircraft and automobiles, is a problem that has not been satisfactorily solved.

SUMMARY OF THE INVENTION

The present invention advantageously provides a system and method for removing material layers formed over a substrate. The invention may be employed to expose the surface of a specific layer of material of a multilayered structure without damaging the surface of the exposed layer or underlying structure. The present invention is well suited for exposing a specific surface of a layer comprising a multilayered structure which may be easily damaged by traditional material removal processes such as abrasion, heat, and/or chemical exposure. The invention finds wide applicability in the paint removal industry, as well as in other industries were it is desirable to remove material layers from structures.

In accordance with one aspect of the invention, the phenomenon whereby a material irradiated by light energy absorbs the light energy in the form of heat is utilized. If the optical power intensity at the irradiated surface of the material is sufficient, the material vaporizes, or is ablated. Ablation is the rapid decomposition and vaporization of a material resulting from the absorption of energy by the material and is associated with the generation of pressure waves radiating from the surface of the material. Continued irradiation causes continued ablation, and hence removal of the irradiated material from the underlying structure. While in the vaporized state, the material generates spectral emissions characteristic of the chemical composition of the material. Advantageously, the present invention monitors such spectral emissions which are used to determine ablation (as well as non-ablation) of a particular material layer. Such spectral emission monitoring is thus employed by the invention to control a material or coating removal process.

A first embodiment of the invention provides a system and method for removing material from a structure examines spectral emissions present in the plume created by ablation of the material with incident radiation. The incident radiation may be from a flashlamp or a laser. The system and method include: (1) generating a pulsed light beam; (2) irradiating the surface material of a structure with the light beam having an intensity sufficient to ablate the surface material and to cause the surface material to generate spectral emission signals having intensities; (3) scanning the structure with the light beam; (4) monitoring the spectral emission signals to detect a selected one of the spectral emission signals having a selected wavelength and generating electronic output signals representative of the intensity of a selected one of the spectral emissions; (5) determining an updated scan speed functionally related to the electronic output signals; and (6) directing the scan speed to be equal to the updated scan speed. A second embodiment determines the updated scan speed based on the intensity of the spectral emission signals detected in predetermined intervals during the pulse period of the light source. A third embodiment invention determines an updated scan speed based on the intensities of the spectral emission signals resulting from a laser pulse irradiating the structure during predetermined intervals during the pulse period of the light source.

A principal advantage of the present invention is that an automated system and method is provided for removing coatings from the surfaces of fragile structures or easily damaged materials, such as carbon-epoxy composites. Another advantage of the invention is that materials can be removed from a structure in an economical manner without generating hazardous wastes requiring special handling for disposal. Further, the system and method of the present invention can be operated with minimal human intervention. The invention may be employed to provide an automated process for removing non-uniformly thick coatings. The invention also discriminates between different material coatings. Such discrimination may be used to identify the irradiated materials and to control a coating removal process. These and other advantages will become more readily appreciated upon review of the specification, drawings, and claims.

BRIEF DESCRIPTION OF THE DRAWINGS

FIGS. 5A and 5B present a flowchart illustrating an example of a process for removing coatings from a substrate embodying features of the system and method of the present invention.

FIG. 9A is a front, cross-sectional, elevation view of a flashlamp mounted in a housing.

FIG. 9B is a side, cross-sectional, elevation view of the flashlamp mounted in the housing.

FIGS. 10A and 10C present a flow chart illustrating a second example of a process for implementing the second embodiment of the system and method of the present invention.

FIG. 11 is a block diagram of a representative third embodiment of a system for selectively removing material from a multilayered structure for exposing a desired surface embodying various features of the present invention, which third embodiment uses a broadband light source for ablating material to be removed, and a laser for generating spectral emissions for controlling the removal process.

FIG. 12A graphically illustrates the scaled output of the flashlamp of FIG. 11 as a function of time, and examples of periodic data sample periods.

FIG. 12B graphically illustrates the output signal of the comparator of data processing circuit 38a of FIG. 16 as a function of time FIG. 12C graphically illustrates the output of the laser of FIG. 11 as a function of time.

FIGS. 13A and 13C present a flowchart illustrating an example of a process for implementing the third embodiment of the invention.

Throughout the specification and drawings, like components are referenced using like reference numerals.

DETAILED DESCRIPTION OF THE PREFERRED EMBODIMENTS

The following description is of the best mode presently contemplated for practicing the invention. This description is not to be taken in a limiting sense, but is made for the purpose of describing the general principals of the invention. The scope of the invention should be determined with reference to the claims.

First Embodiment of the Invention

Figure 1:
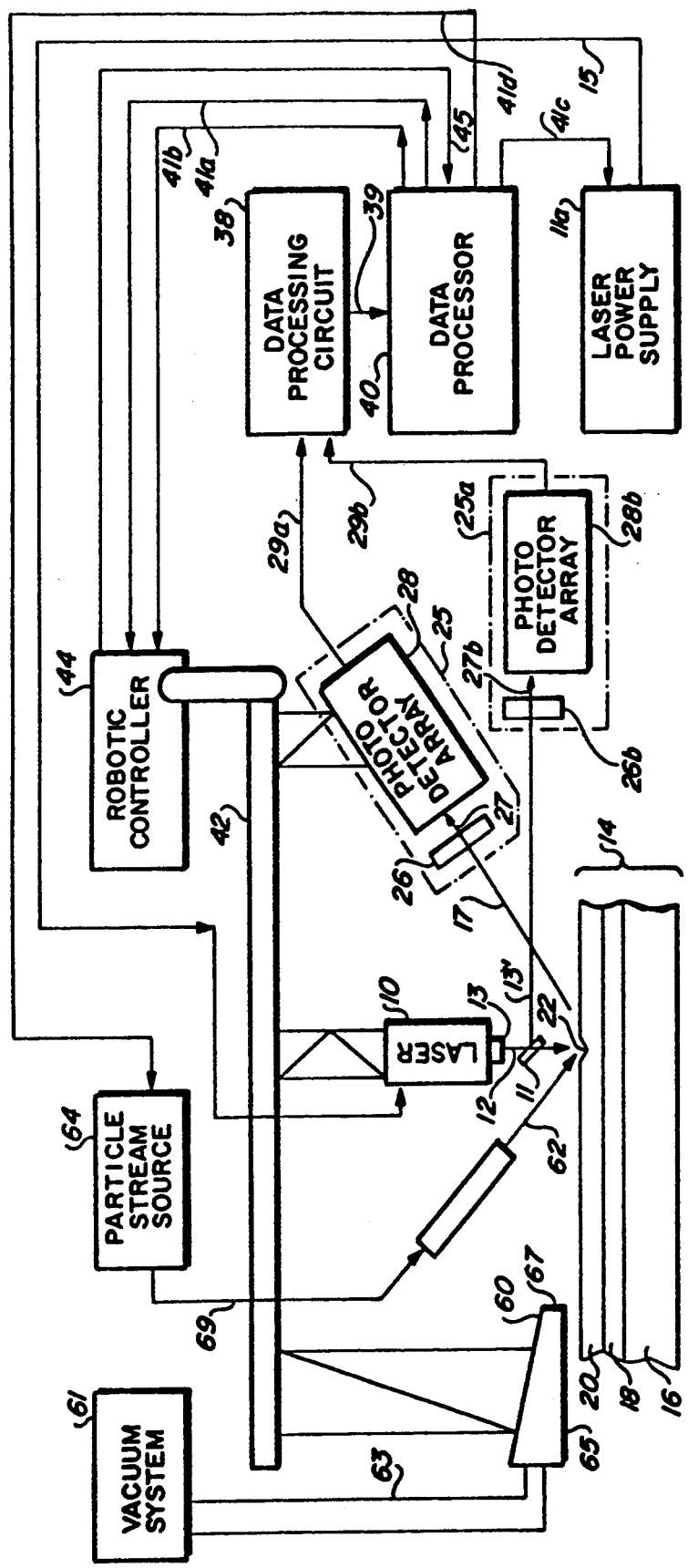
FIG. 1 is a block diagram of one representative embodiment of a system for selectively removing material from a multilayered structure in accordance with the present invention.

Referring to FIG. 1, there is shown a laser 10 for generating pulsed laser beam 12 directed to irradiate and scan the surface of structure 14 along a predetermined path. Laser beam 12 may have a modulation frequency in the range of 500–100 Hz and a pulse width of about 0.2 microseconds. Laser 10 is controlled by signal 15 from laser power supply 11a of a type conventionally known. Power Supply 11a itself is controlled by signals 41c provided by data processor 40. The advantages of the invention will be more readily appreciated where structure 14 is exemplified as being comprised of substrate 16 having one or more layers, such as layers 18 and 20, of material. However, the invention may also be employed to remove materials from other types of structures such as homogenous or aggregate structures.

In response to being irradiated at an intensity which may be in the range of 1–5 joules/$cm^2$ by laser beam 12, layer 20 ablates, forming a plume of hot material. The plume emits line radiation, or spectral emission signals 17, in the form of light having wavelength components characteristic of the ablating material. Signals 17 are received by photodetecting system 25 which generates electronic signals 29a representing the intensities of the detected emissions. Photodetecting system 25 includes optical filter 26 and photodetector array 28. By way of example, filter 26 may be implemented as an Oriel analytical line filter such as Model 57XXX. The signals 17 are filtered by optical filter 26 which is selected to transmit only certain light signals 27 having "signature" wavelengths known to be associated with the spectral emissions of a particular material, as for example, the material comprising a layer of structure 14 that is desired to be exposed or removed, depending on the particular application. The signature wavelengths are used to determine whether the particular material is being ablated.

Photodetector array 28 generates electronic output signal 29a in response to receiving signal 27 which is received by data processing circuit 38. Optical beam splitter 11 transects laser beam 12 to provide sample laser beam 13' to photodetecting circuit 25a. Data processing circuit 38 also receives data from photodetecting circuit 25a which includes narrow bandpass optical filter 26b and photodiode 28b. Photodetecting circuit 25a detects the laser output 13' through optical filter 26b which provides optical signal 27b to photodetector diode 28b. Photodiode 28b transforms optical signal 27b into a corresponding electrical signal 29b that is also provided to data processing circuit 38.

Figure 6:
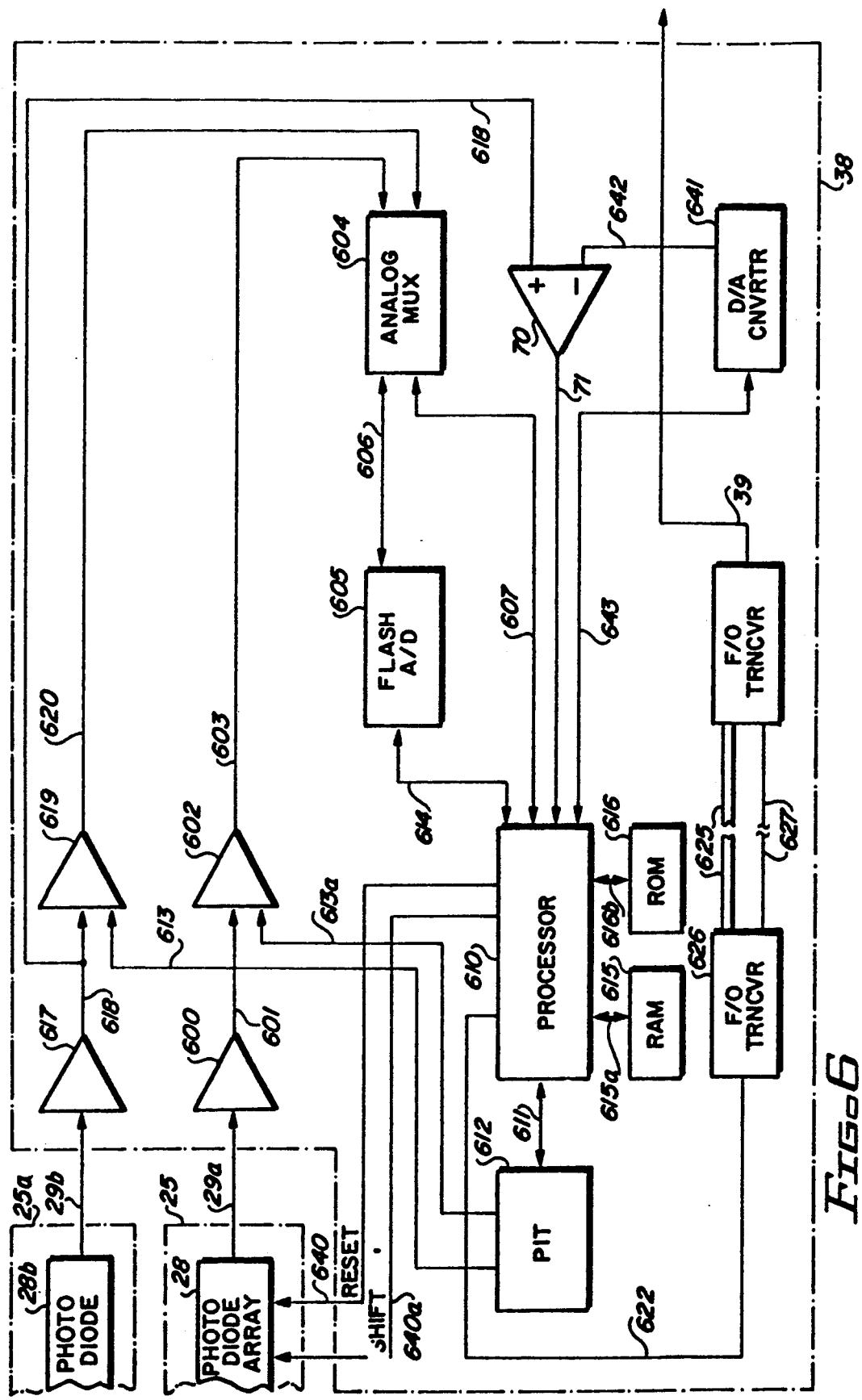
FIG. 6 is a block diagram of the data processing circuit 38 of FIG. 1.

Referring to FIG. 6, data processing circuit 38 continuously receives data provided by signals 29a and 29c, but only uses data generated at specific intervals established by the output of comparator 70 in accordance with reference values of digital-to-analog convertor 641 when laser 10 is generating optical energy to determine an appropriate value for speed control output signal 39. Photodiode array 28 of photodetecting circuit 25 continuously detects light signals 17, but only stores them in response to receiving a reset signal 640 from processor 610. Photodiode array 28 includes M×N photocells, however, to facilitate understanding of the operation of circuit 38, and by way of example only, photodiode array 28 may be have a 1×100 array. Photodiode 28b of photodetecting circuit 25b continuously detects the presence of reference laser beam 12', and generates analog signal 29b which is amplified and preferably scaled from 0–5 volts by amplifier 617. The scaled, amplified DC analog signal 618 is received by track-and-hold 619, which outputs signal 620 in response to receiving a hold input signal 613 from parallel interrupt timer 612. The data stored in photodiode array 28 is output as signal 29a, which then is amplified and preferably scaled between 0–5 volts by amplifier 617 as signal 601. Next, signal 601 is presented to track-and-hold 602.

Data stored in each of the cells of photodiode array 28 is serially output as signal 29a in response to photodiode array 28 receiving a series of clocked shift signals 640a from processor 610. For example, for a 1×100 array, processor 610 first generates a timed shift signal associated with an index of "0" which causes data from the first photodiode of array 20 to be output as signal 29a, amplified by amplifier 600, and then presented to track-and-hold 602. Each successive shift greater than the index value associated with the previous shift signal 640a by "1". Thus, if photodiode 28 has 100 photodiodes, processor 610 generates 100 shift signals represent by indexes from 0–99. Processor 610 generates a timing signal 611 which is received by parallel interrupt timer 612 and which is simultaneously generated when each shift signal 640a is generated. In response to receiving timing signal 611, parallel interrupt timer 612 begins a countdown after which it generates hold signals 613 and 613a which trigger track-and-holds 619 and 602, respectively. The period of the countdown implemented in parallel interrupt timer 612 should be sufficient to allow the signals presented to track-and-holds 619 and 602 to stabilize. At a predetermined time after the shift signal 640a having an index of "0" triggers the output of signal 29a by track-and-hold 602, parallel interrupt timer 612 provides hold signals 613 and 613a to track-and-holds 602 and 619, respectively, resulting in the presentation of signals 603 and 620 to MUX 604. MUX 604 serially conveys signals 603 and 620 via signal 606 line to flash analog-to-digital converter 605 in response to receiving address signals 607 generated by processor 610. The digitized representations of signals 620 and 603 are received by processor 610, via data bus 614, which divides the value of signal 603 by the value of signal 620 to produce a normalized value representing the data stored by photodiode number "1" in photodiode array 28. This normalized value is provided by processor 610 via data bus 615a to be stored in RAM 615.

Trigger signal 13 is preferably generated only once for each cycle of the transfer of all data stored in photodiode array 28, typically within the countdown period after the shift signal 640a having a "0" index is generated. Track-and-hold 602 presents signal 603 to MUX 604 in response to receiving hold signal 613a. This process is repeated for each data stored in the cells 1-99 until all of the digitized representations of data stored in photodiode array 28 are normalized by processor 610 and stored in the RAM 615. Control of processor 610 is effected by instructions stored in ROM 616 and conveyed to processor 610 via data bus 616b.

After all of the digital representations of data stored in photodiode array 28 has been normalized and stored in RAM 615, processor 610 generates a reset signal 640 which causes photodiode array 28 to store whatever optical information it is presently detecting.

Processor 610 also controls when data is to be stored by photodiode array 28 because it is desirable to process data detected only during specific times during the pulse period of laser 10 (referred to as the "data sample mode").

Control of the data sample mode may be effected by providing signal 618 as one input to window comparator 70. The other input to window comparator 70 is a reference voltage provided by digital-to-analog converter 641. D/A converter 641 generates an analog output voltage signal 642 at a reference voltage, $V_{Ref}$, that is compared with signal 618 by comparator 70. When the difference between signals 618 and 642 is within a predetermined interval, the output signal 71 of comparator 70 becomes a logic "high." When processor 610 detects signal 71 as a logic "high", processor 610 goes into the data sample mode by generating the series of shift signals 640a, reset signal 640, and the series of signals 611, as described above so that data stored in photodiode array 28 and provided by photodiode 28b are stored and processed by processor 610.

The output signal 642 has a value of $V_{Ref}$ only when the voltage level of signal 618, $V_{618}$, is between certain voltage limits which may be in accordance with the relation: $V_{WC} < V_{618} < V_{WO}$, where $V_{WC}$ represents a reference voltage for which the window loses, and $V_{WO}$ represents the reference voltage for which the window opens. The values for $V_{WO}$ and $V_{WC}$ are provided by processor 610 to D/A converter 641 via data bus 643, and may be determined empirically by trial and error. The values of $V_{WO}$ and $V_{WC}$ may be input into processor 610 by means well known by those skilled in the art.

Figure 18:
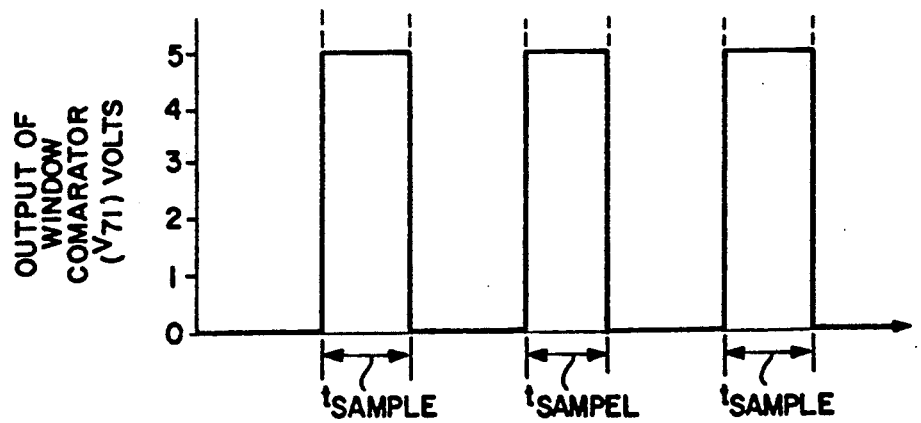
FIG. 18 is a graph qualitatively illustrating the amplitude of the interrupt signal 71 of data processing circuit 38 of FIG. 1 as a function of time.

By way of example, the output of laser 10 may be qualitatively represented by signal 618 and scaled from 0-5 volts, as graphically presented in FIG. 18. For purposes of illustration, and by way of example only, $V_{WO}$ may be 3 V and $V_{WC}$ may be 2 V. In such case, the output signal 642 may be equal to the reference voltage, $V_{Ref}$ during the sample intervals, $t_{sample}$. In such case, TTL signal 71 is a series of pulses preferably having a voltage level, $V_{71}$, of 5 V during each sample interval, $t_{sample}$, as shown in FIG. 19. Thus, it can be appreciated that data processing circuit 38 controls the retrieval and processing of data generated by photodetecting circuits 25 and 25b within specific time intervals during the duty cycle of laser 10.

Signal 71 is an interrupt signal. Therefore, whenever signal 71 is a logic "high," processor 610 operates in a data sample mode. During the intervals when signal 71 is a logic "low," processor 610 may perform other functions, as for example, processing the data obtained during the data sample mode to determine a scan speed value and generate a corresponding scan speed control output 622. Details regarding the processing of data stored in RAM 615 are set forth further herein. The output signal 622 of processor 610 is a scan speed control signal which is provided to data processor 40 as described further herein.

Data processor 38 may calculate $\underline{N}$, where $\underline{N} =$ $$\frac{\sum_{i=1}^{m} \left( \frac{\text{Signal } 29a_i}{\text{Signal } 29b} \right)}{m} \quad (1)$$

and i represents a particular photodiode in photodiode array 28, and $\underline{m}$ represents the total number of photodiodes in array 28. The purpose of the value $\underline{N}$ is described further herein. $\underline{N}$ represents the normalized average intensity of the optical data detected and stored in photodiode array 28.

In accordance with a processing routine, described more fully herein, processor 610 determines a control output signal 622 that determines the manner by which laser 10 irradiates structure 14. For example, control signal 622 may correspond to a suitable scan speed of laser beam 12 across structure 14, or to an "index" control signal used to direct the output of laser 10 to irradiate another area on the surface of structure 14 an incremental, discrete distance from the area being presently irradiated. Digital electrical control signal 622 is transformed into a corresponding digital optical signal 625 by fiber optic transceiver 626, e.g., a Litton Fiber Optics Transceiver, Model E03675-2. Signal 625 propagates via optical fiber 627 to a remote fiber optic transceiver which converts digital optical signal 626 into a digital electrical signal 39. The conversion of the output control signal 622 of processor 610 into optical signal 625 allows the control signal to be propagated long distances relatively immune from electromagnetic interference or "EMI".

Laser 10 and photodetecting systems 25 and 25a are mounted on robotic positioner 42, controlled by robotic controller 44. A beam splitter 11 transects laser beam 12 to provide a sample laser beam 12' to photo-detecting system 25a. Laser 10 is directed to scan structure 14 with laser beam 12 along a predetermined path in accordance with path instruction signal 41a provided by data processor 40 to controller 44. While structure 14 is being irradiated with laser beam 12, photodetector system 25 is disposed to detect any spectral emission signals 27 filtered from spectral emission signals 17. In one variation of the invention, the speed of robotic positioner 42 is controlled by control signal 622 which is generated using a suitable processing routine implemented in and provided by processor 610 to processor 40. Processors 610 and 40 may communicate with one another using simple RS-232 handshake techniques, as are well known by those skilled in the art. In another variation of the invention, the output control signal 622 may be a logic "high" or "low" used to direct robotic positioner 42 so that laser beam 12 scans structure 14 a discrete distance. This latter processes may also be referred to as indexing. In response to receiving control signal 39, processor 40, in turn, generates robotic control signal 41b to robotic controller 44.

In one variation of the invention, the value of control signal 41b is related to digital output signal 39 by a function which may be either increasing or decreasing, depending on the requirements of any particular application, as described in greater detail further herein.

Again referring to FIG. 1, nozzle 60, mounted to robotic positioner 42, ejects a particle stream 62 which is directed to impinge, and thereby cool structure 14 at an area just irradiated by laser 10. The particle stream may be comprised of gas, liquid, of solid particles, or a combination of solid particle entrained in a gas or liquid. Particles 62 are supplied to nozzle 60 via duct 69 from particle stream source 64, which may be for example, gas tanks, or a carbon dioxide pellet source of the type commercially available from Cold Jet, Inc., Loveland, Ohio. The particle stream advantageously sweeps the ejecta of ablating material from the area being irradiated by laser 10. Particle stream source 64 may be selectively enabled by signal 41d provided by data processor 40.

Referring to FIG. 1, the invention may also employ a vacuum system 61 which includes duct 63 and nozzle 65. Nozzle 65 is mounted to robotic positioner 42 so that vacuum system 61 continuously draws the ablated ejecta and expended particle stream through inlet 67 of the nozzle as laser 10 and the particle stream scan the surface of structure 14. Nozzle 65 is shown in FIG. 1 as being supported by robotic positioner 42.

Data processor 40 may be an IBM AT or AT compatible personal computer, although the scope of the invention includes the use of data processors other than that specifically identified above. Robot positioner 42 may be a CIMROC 4000 Robot Controller manufactured by CIMCORP Precision Systems, Inc., Shoreview, Minn. However, it is to be understood that other commercially available industrial robots may also be employed in the implementation of the present invention.

Figure 3:
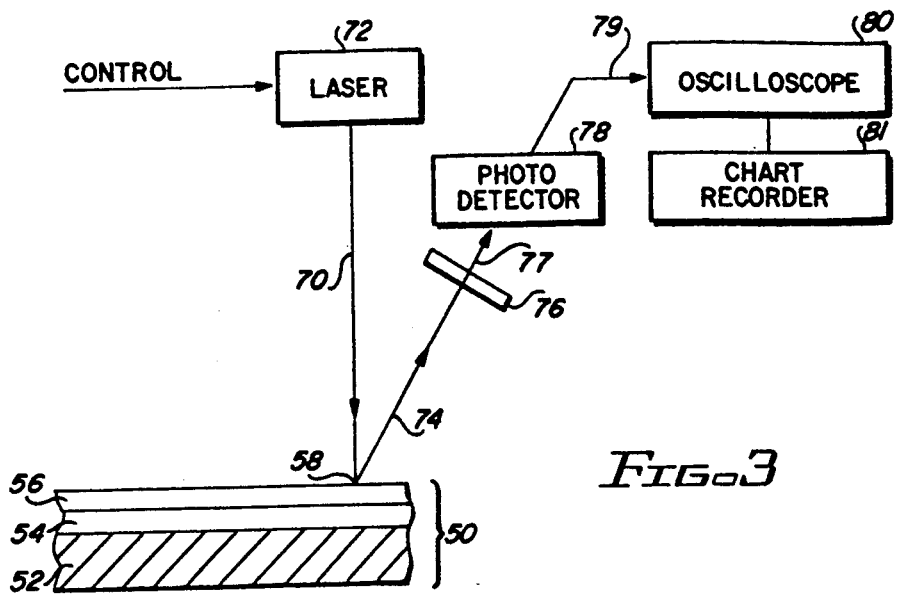
FIG. 3 depicts an apparatus for detecting and recording spectral emissions generated by ablating a typical multilayered structure having a selected surface to be exposed.

To verify that materials may be distinguished based on the intensity of their spectral emissions, an experiment was conducted as described with reference to FIGS. 3 and 4. Structure 50 is shown in FIG. 3 to comprise aluminum substrate 52 painted with primer 54 (MIL-P-23377) on which is painted topcoat 56 (MIL-C-83286). Primer 54 contains about 4-5% by weight strontium chromate (a corrosion inhibitor) and topcoat 56 is comprised of about 2% strontium chromate. Any of the strontium or chromium atomic or ionic emission lines can be monitored to determine ablation of primer 54, as well as, ablation of materials which are not primer 54. In the experiment, the intensity of the chromium emission line at 425 nm was selected to identify the presence of strontium chromate.

Referring to FIG. 3, structure 50 was irradiated at normal incidence with a series of pulses from a pulsed laser beam 70 generated by a Questek Series 2000 excimer laser generating UV light at 248 nm. Laser beam 70 was modulated at 10 Hz with a pulse width of 100 nanoseconds. The incidence intensity at surface 58 was 3.8 joules/cm$^2$. In response to being irradiated, material in the vicinity of region 58 ablated and generated spectral emission signals 74 that were filtered by a narrow bandpass optical filter 76 having a center wavelength transparency of 425.4 nm. Light having a wavelength of 425 nm, included as a component of light signal 74, was emitted by ablation of primer 54 and passed through optical filter 76 as light signal 77. Signals 77 were detected by an EG&G OMA monochromometer (photodetector) 78 which generated electronic signals that were provided to a LeCroy 9400 Series oscilloscope 80. The output of photodetector 78 as observed on a Unisis chart recorder 81 is graphically represented in FIG. 4.

Figure 4:
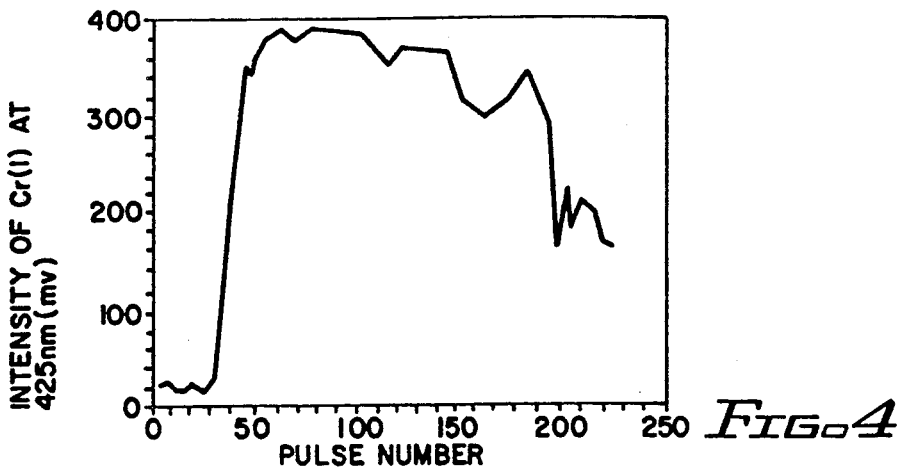
FIG. 4 is a graph illustrating the amplitude of the spectral emissions of ablating chromium at a wavelength of 425 nanometers.

As can be seen in FIG. 4, the amplitude of signals 79 associated with pulse numbers 0–30 is about 20 millivolts, representing ablation of topcoat 56. The amplitude of signals 79 associated with pulse numbers 50–200 are represented by a voltage exceeding 200 mv and clearly was generated by ablation of primer 54. Beyond pulse number 200, the amplitude of signals 79 decreases, representing almost complete removal (by ablation) of primer 54 and commencement of irradiation of aluminum substrate 52 by laser beam 70.

Thus, it is seen that the apparatus and system shown in FIGS. 1 and 3 can readily distinguish ablation of different materials by monitoring the peak intensities of the spectral emissions generated by such ablated materials.

The method implemented by the system of the present invention is most advantageously employed where there is a discernable difference between the wavelength of the output of the laser and the selected wavelength of the spectral emission desired to be detected. This difference assures that the laser beam does not interfere with detection of the selected spectral emissions. In applications where the invention is employed to expose the selected surface of a multilayered structure, such as structure 14, the material of the layer to be exposed should generate spectral emissions having a wavelength signature that is distinguishable from the spectral emissions resulting from ablation of other materials comprising the structure. Otherwise the materials may not be distinguished.

Figure 2A:
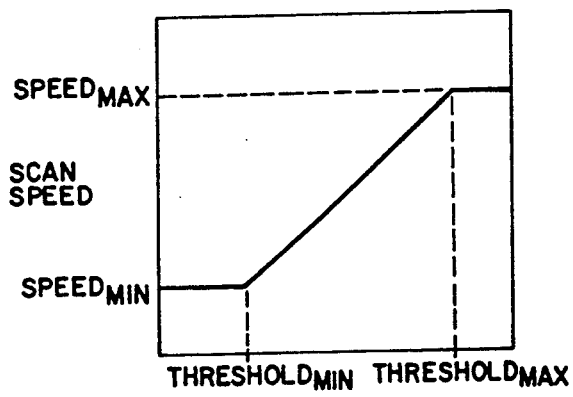
FIG. 2A is a graph illustrating an example of an increasing functional relation between the speed of the robotic positioner and the average normalized amplitude of selected spectral emission signals.

As described above, the speed of robotic positioner 42 in relation to the normalized average of the peak pulse amplitude of output signal 29a, as represented by signal 39, may generally be a function of the ratio of the values of output signals 29a and 29b, and is bounded between minimum and maximum limits. FIG. 2A illustrates an example of an increasing function. Such function may be increasing in applications where it is desired to remove one or more layers of material (such as layers 20 and 18) to expose an underlying layer, where spectral emissions generated by the layer to be exposed (as for example, substrate 18) are used to control the process. Such application may be referred to as a Case 1 application.

In Case 1, where the relation of speed as a function of N is increasing, as shown in FIG. 2A, then if N is equal to or less than a minimum threshold value, Threshold$_{min}$, signal 39, generated by data processing circuit 38 may be such that the speed of robotic positioner 42 is controlled to be a minimum scan speed, Scan Speed$_{min}$. If N is equal to or greater than a maximum threshold value, Threshold$_{max}$, then signal 39 generated by processor 38 may be such that the speed of robotic positioner 42 is controlled to be the maximum scan speed, Scan Speed$_{max}$. Techniques for generating such an output control signal as a function of the values of input data, such as signals 29a and 29b, from a digital data processor are well known by those of ordinary skill in the art.

The values for Threshold$_{min}$ and Threshold$_{max}$ are determined empirically as described below preferably using the system and methods described above with regard to FIG. 1. A number of test scans are made using laser 10 to irradiate and ablate material at the surface a fresh sample structure representative of the structure that is to be processed by the method and system of the present invention. The test samples are scanned at different speeds to determine appropriate minimum and maximum speeds for robotic positioner 42. Signals 27 and 27b from photodetecting circuits 25 and 25a are processed by a data processing circuit 38. The values of $\underline{N}$, determined from each test scan are recorded for each test using conventional methods. An operator then examines each of the test samples and determines which ones have acceptable finishes.

The minimum threshold value, $Threshold_{min}$, is obtained by first identifying the test sample having the most material removed, but still having an acceptable surface finish, as determined by appropriate acceptance criteria, such as the color, texture, and spectral emission characteristics of the sample. Then, an appropriate percentage of $\underline{N}$ associated with that test sample may be selected to be $Threshold_{min}$. The selection of an appropriate percentage of the value of $\underline{N}$ used to establish the minimum threshold value is based on experience for a given application.

The maximum threshold value, $Threshold_{max}$ is obtained by identifying the test sample having the least amount of material removed, but still having an acceptable finish. Again, this determination is based on appropriate acceptance criteria, as described above. Then, some substantial percentage of $\underline{N}$ associated with the data resulting from that test sample is chosen to be $Threshold_{max}$.

The maximum scan speed, $Scan\ Speed_{max}$, is derived from the scan speed of robotic positioner 42 used when generating the data associated with $Threshold_{max}$. The maximum scan rate may be established at a rate somewhat less than the maximum observed scan rate in order to provide for a margin of error. For example, if the maximum observed acceptable scan rate is 4.0 inches/second and a safety factor of 10 percent is desired, the maximum scan rate may be established at 3.6 inches/second. However, it is to be understood that scan rates or speeds may also be employed, other than those given by way of example above.

A high scan rate results in reduced optical energy being absorbed per unit area at the surface of the irradiated structure because the laser is traveling relatively fast, resulting in reduction in the depth of material being ablated. The maximum scan speed of robotic positioner 42 is limited to assure that sufficient depth of material is removed from the structure.

The minimum scan speed, $Scan\ Speed_{min}$, is derived from the scan speed of robotic positioner 42 used when generating the data associated with $Threshold_{min}$. The minimum scan speed is preferably established at a rate somewhat greater than the scan speed associated with $Threshold_{min}$ in order to provide for a margin of error. For example, if the minimum acceptable scan rate is 2.0 inches/second and a safety factor of 10 percent is desired, the minimum scan rate may be established at 2.2 inches/second. Again, it is to be understood that utilization of the present invention is not to be construed as being limited to these scan rates above.

A low scan speed results in more optical energy/unit-time being absorbed by the irradiating structure, hence a greater depth of material is ablated from the irradiated area of the structure. Damage occurs if the area being irradiated is exposed to too much optical energy/unit-time. The minimum scan speed of robotic positioner 42 is controlled to prevent such damage.

Figure 5A:
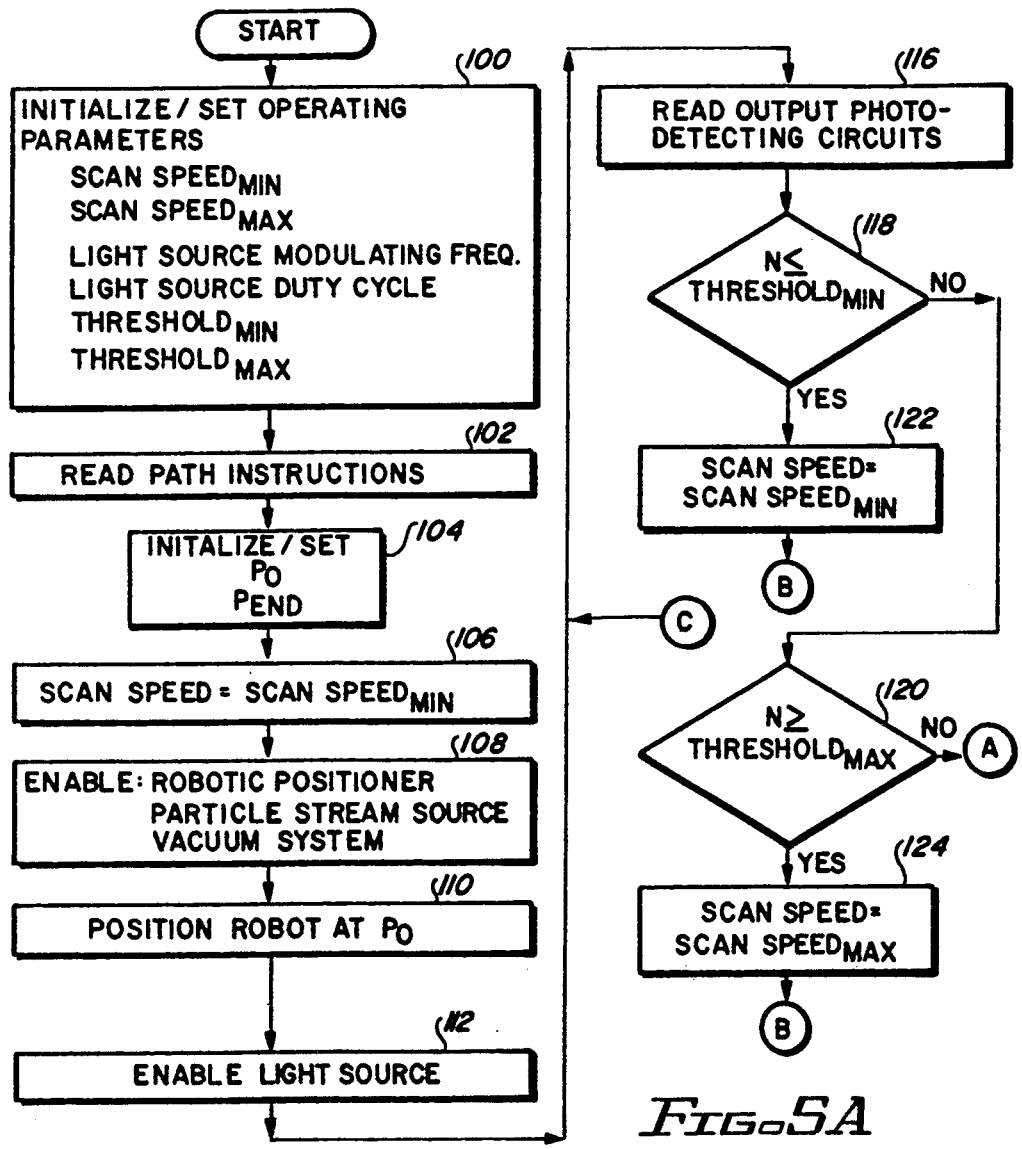

An example of the operation of the method and system of the above described embodiment of the present invention with reference to Case 1 may be more fully appreciated with reference to the flowchart presented in FIGS. 5A and 5B, collectively, and the following discussion. The steps associated with such flowchart may be readily incorporated into a suitable control program implemented in processor 610, processor 40, and/or robotic controller 44 (FIG. 1), or equivalent control apparatus using well known techniques. The operating parameters for the minimum and maximum scan speeds of robotic positioner 42 (Scan $Speed_{min}$ and Scan $Speed_{max}$, respectively), $Threshold_{min}$, and $Threshold_{max}$, are provided to processor 610 at step 100. Also, the modulation frequency and duty cycle for laser 10 are input into data processor 40 at step 100. Path instructions are input into and read by data processor 40 at step 102. The path instructions define the predetermined path of robotic positioner 42. Then, based on the path instructions, values corresponding to the initial position, $P_o$, and the end position, $P_{end}$, of robotic positioner 42 along the path are set at step 104. Next, the initial variable for the scan speed of robotic positioner 42 is set equal to the minimum scan speed, Scan $Speed_{min}$ at step 106. Robotic positioner 42 is enabled at step 108 and moved to its initial position, $P_o$ at step 110. At steps 112 and 114, laser 10 and particle stream source 64 are enabled. At this stage, laser 10 outputs laser beam 12 which is irradiating structure 14 at an appropriate location.

Ablating surface 22 generates spectral emissions 17 which are filtered by photodetecting systems 25 and 25a which generate signals 29a and 29b, respectively. Such signals are read by processor 610 at step 116. At step 118, processor 610 determines if the value, $\underline{N}$, is equal to or less than a minimum threshold value, $Threshold_{min}$. If that determination is YES, then the process proceeds to step 122 where processor 610 defines the value for the variable scan speed, Scan Speed, to be equal to the minimum scan speed, Scan $Speed_{min}$. If the determination at step 118 is NO, then processor 610 determines if $\underline{N}$ is equal to or greater than the maximum threshold value, $Threshold_{max}$. If the determination at step 120 is YES, processor 610 defines the scan speed to be equal to the maximum scan speed, Scan $Speed_{max}$. If the determination at step 120 is NO, then processor 610 determines the scan speed at step 126 for a Case 1 application, based on a suitable increasing functional relation between the scan speed and $\underline{N}$. Then, the value of the scan speed control output 622 is set equal to the determined scan speed at step 127. Next, processor 610 provides an appropriate scan speed control output signal 622 to data processor 40, as previously described. Data processor 40, in turn, generates robotic speed control signal 41b which is provided to robotic controller 44 at step 128. Controller 44 directs robotic positioner 44 to move at the appropriate scan speed.

Then, data processor 40 reads data representative of the position of robotic positioner 42 at step 130 and determines the position of robotic positioner 42 at step 131, in accordance with well known techniques, since computer controlled robotic positioning systems are commercially available. One method by which the position of robotic positioner 42 may be determined is to employ a feedback signal 45 provided from robotic controller 44 to data processor 40. Feedback signal 45 may include the output signals of one or more rotary shaft encoders, not shown, having phase-quadrature output signals. Feedback signal 45 typically includes data from one rotary shaft encoder for each axis of motion necessary to define the position of robotic positioner 42, as for example, by coordinates of the X, Y, and Z axes. Assessment of the position of robotic positioner 42 may also require angular displacement data from one or more rotational axes. Techniques for providing data necessary to define the position of a robot actuator and for interpreting such data are well known by those of ordinary skill in the art.

After the position of robotic positioner 42 has been determined, a decision is made by data processor 40 at step 132 as to whether the present position, $P_I$, of robotic positioner 42 along the predetermined path is the position, $P_{end}$, at the end of the predetermined path, previously defined by the path instructions input into data processor 40 at step 102. If the determination at step 132 is YES, then the processing of structure 14 is complete, since laser 10 has scanned the entire predetermined path. Then, at step 136, data processor 40 provides output signals to disable particle stream source 64, robotic controller 44 so as to disable robotic positioner 42, and laser power supply 11 to disable laser 10. However, if the determination at step 132 is NO, then laser 10 has not scanned the entire predetermined path along structure 14 and structure 14 has not been completely processed. Then, the process continues at step 116, as described above.

Figure 2B:
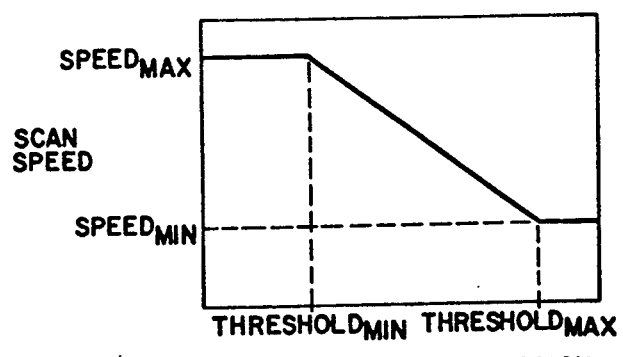
FIG. 2B is a graph illustrating an example of a decreasing relation between the speed of the robotic positioner and the average normalized amplitude of selected spectral emission signals.

It is to be understood that there may be some applications where it is desirable for the speed of robotic positioner 42 to be related to $\underline{N}$ by a decreasing function between limits as shown in FIG. 2B. Such case arises where it is desired to remove a layer of material (as for example, layer 20 of structure 14) to expose an underlying layer (as for example, layer 18) where the spectral emission signals generated by the ablating layer to be removed are used to control the process. Such case may be referred to as Case 2. In a Case 2 application the invention may be implemented as described with reference to FIGS. 5A and 5B. However, at step 126, the value of signal 39, or 622, may be functionally related to $\underline{N}$ as set forth above with reference to FIG. 2B.

In Case 2, described with reference to FIGS. 2B and 4, ablation of a coating, such as primer containing chromium, from an aluminum substrate generates spectral emission signals at 425 nm. The amplitude or intensity of the spectral emissions peaks between about 75 and 200 pulses. Thereafter, diminishing amounts of primer are available to be ablated, so the amplitude of the spectral emissions rapidly diminishes. Control of a Case 2 application may be effected where the scan speed of the laser beam is functionally related to $\underline{N}$ by a decreasing function, as for example, depicted in FIG. 2B.

As the primer is ablated, it generates strong spectral emission signals at a wavelength characteristic of the primer indicating that the underlying aluminum surface has not been exposed. Therefore, it is desirable for the scan speed of the laser beam to be relatively low so that the primer is irradiated with enough pulses to be removed from the surface of the aluminum. However, as the aluminum becomes exposed, there is less primer to generate spectral emission signals at 425 nm, as indicated by spectral emissions having a low amplitude. In order to prevent damage to the aluminum, the scan speed is increased.

In Case 2, the minimum threshold is selected so as to be associated with the maximum scan speed that results in an acceptable surface finish using criteria as previously set forth herein. This set of conditions indicates the maximum degree of exposure of the desired surface. The maximum threshold is selected so as to be associated with the minimum scan speed that results in an acceptable surface finish indicative of the minimum degree of exposure of the desired surface. Processor 610 may be suitably programmed using standard techniques so as to implement a decreasing functional relation between the value of output signal 622 and $\underline{N}$.

Second Embodiment of the Present Invention

A second embodiment of the present invention also provides a system and method for removing material from a structure, and may be employed to expose a surface of a specific layer of a multilayered structure without damaging the exposed surface, or any surfaces underlying the exposed service. The second embodiment employs a flashlamp light source to generate a light beam for irradiating the structure, whereas the first embodiment uses a laser for this purpose. A flashlamp, or flashtube, is a gas filled device which converts electrical energy to optical energy by passing current through a plasma typically contained in a transparent tube through which the optical energy is transmitted.

Figure 7:
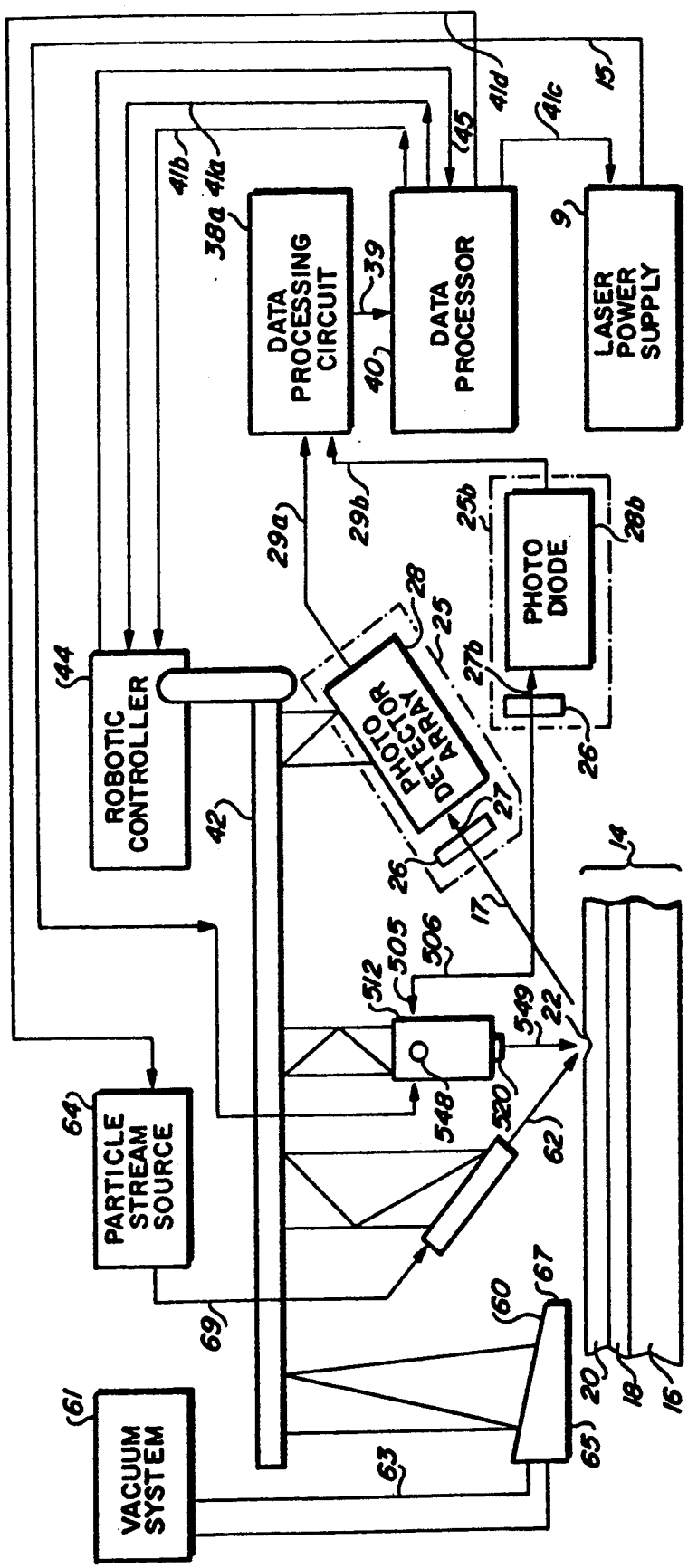
FIG. 7 is a block diagram of a representative second embodiment of a system for selectively removing material from a multilayered structure to expose a desired surface embodying features of the present invention.

A block diagram of the second embodiment is presented in FIG. 7 where there is shown pulsed light source 548 which is preferably a broadband flashlamp for generating light beam 549 through quartz window 520 in order to irradiate and scan the surface of structure 14 along a predetermined path. Flashlamp 548 is controlled by output signal 15 provided by conventional flashlamp power supply 9, which in turn is controlled by output signal 41c from data processor 40. Flashlamp 548 may be a xenon flashlamp having a broadband output beam. The output of a broadband flashlamp offers the advantage of providing a wide variety of electromagnetic spectrum components, enhancing the probability that some of the components will be absorbed in the form of heat by a wide variety of different materials so that materials irradiated by the flashlamp are ablated.

The output of flashlamp 548 is modulated at an appropriate frequency, e.g., 4 Hz, and has a fixed pulse width in the range of about 1200-2400 microseconds. Pulse widths of about 1200 microseconds have been found suitable for removing coatings of paint from plastic composite structures, whereas pulse widths of about 2400 microseconds may be employed to remove coatings from metal surfaces. In the preferred embodiment, the incidence intensity of the beam 549 at the surface of the structure 14 is on the order of 9-10 joules/cm$^2$.

In response to being irradiated by light beam 549, layer 20 forms a plume, not shown, which generates spectral emission signals 17 that are monitored by photodetector circuit 25, comprising filter 26 and M×N photodetector array 28, where $\underline{M}$ and $\underline{N}$ are positive integers. Signal 17 is filtered by narrow bandpass optical filter 26 which is transparent only to selected wavelengths, but also transmits signals 27 whenever such signals are components of light beam 549. Signals 27 are detected by photodetector array 28 and transformed into corresponding electrical output signals 29a. A fused quartz light pipe 505 penetrates housing 512 in which flashlamp 548 is mounted and transmits a reference light signal 506 via optical fiber to photodetector circuit 25b comprising filter 26c and photodiode 28b. [It is to be understood that the signal appearing on a given signal line may be referred to by use of the same reference number as the signal line.] Filters 26 in photodetecting circuits 25 and 25b preferably have the same narrow bandpass characteristics. Light signal 506 references the instantaneous output of the flashlamp 548.

Photodetecting circuit 25b generates reference electrical analog signal 29c which is provided to data processing circuit 38a which uses signals 29a and 29c as inputs to determine an appropriate scan speed of robotic positioner 42, as represented by speed control output signal 39.

Flashlamp 548 and photodetecting systems 25 and 25b are mounted on robotic positioner 42 which is enabled by robotic controller 44. Data processor 40 interprets speed control output signal 39 and generates its own speed control signal 41b that is provided to robotic controller 44. Data processor 40 also generates path instructions to controller 44 whereby robotic positioner 42 is directed to travel a predetermined path in accordance with well known techniques. Thus, flashlamp 548 scans structure 14 with light beam 549 along the predetermined path on the surface of structure 14 by controlling the output of robotic positioner 42.

Because flashlamp 548 in the second embodiment is a broadband source, the light beam 549 may include spectral components having the same wavelengths that are desired to be monitored by photodetecting circuit 25. Hence, photodetecting circuit 25 may detect all light having wavelengths equal to the wavelengths selected by optical filter 26, regardless of whether such wavelengths are generated by flashlamp 548 or are from the plume of the materials ablating from structure 14. Therefore, it is necessary for data processing circuit 38a to interpret spectral emissions only generated by the ablating materials.

Data processing circuit 38a continuously receives data provided by signals 29a and 29c, but only uses data generated at specific intervals established by the output of comparator 70 in accordance with reference values of digital-to-analog converter 641 when the flashlamp 548 is generating optical energy to determine an appropriate value for speed control output signal 39.

Figure 8:
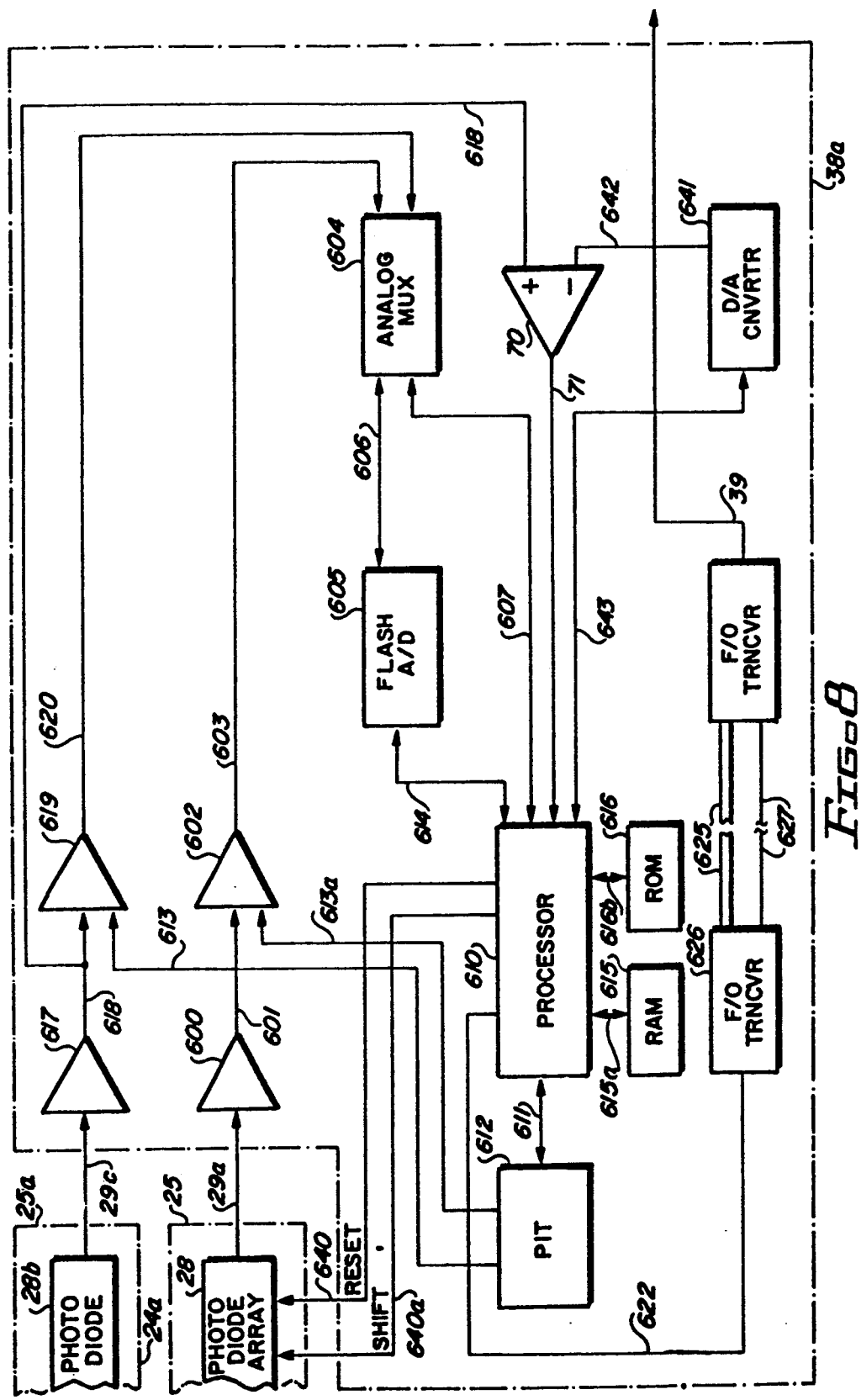
FIG. 8 is a block diagram of the data processing circuit 38a of FIG. 7.

Referring to FIG. 8, photodiode array 28 of photodetecting circuit 25 continuously detects light signals 17, but only stores them in response to receiving a reset signal 640 from processor 610. As previously stated, photodiode array includes M×N photocells, however, to facilitate understanding of the operation of circuit 38a, and by way of example only, photodiode array may be have a 1×100 array. Photodiode 28b of photodetecting circuit 25b continuously detects the output of flashlamp 548, and generates analog signal 29c which is amplified and preferably scaled from 0-5 volts by amplifier 617. The scaled, amplified DC analog signal 618 is received by track-and-hold 619, which outputs signal 620 in response to receiving a hold input signal 613 from parallel interrupt timer 612. The data stored in photodiode array 28 is output as signal 29a, which then is amplified and preferably scaled between 0-5 volts by amplifier 617 as signal 601. Next, signal 601 is presented to track-and-hold 602.

Data stored in each of the cells of photodiode array 28 is serially output as signal 29a n response to photodiode array 28 receiving a series of clocked shift signals 640a from processor 610. For example, for a 1×100 array, processor 610 first generates a timed shift signal associated with an index of "0" which causes data from the first photodiode of array 20 to be output as signal 29a, amplified by amplifier 600, and then presented to track-and-hold 602. Each successive shift signal 640 is associated with an index value which is greater than the index value associated with the previous shift signal 640a by "1". Thus, if photodiode 28 has 100 photodiodes, processor 610 generates 100 shift signals represent by indexes from 0-99. Processor 610 generates a timing signal 611 which is received by parallel interrupt timer 612 and which is simultaneously generated when each shift signal 640a is generated. In response to receiving timing signal 611, parallel interrupt timer 612 begins a countdown after which it generates hold signals and 613a which trigger track-and-holds 619 and 602, respectively. The period of the countdown implemented in parallel interrupt timer 612 should be sufficient to allow the signals presented to track-and-holds 619 and 602 to stabilize. At a predetermined time after the shift signal 640a having an index of "0" triggers the output of signal 29a by track-and-hold 602, parallel interrupt timer 612 provides hold signals 613 and 613a to track-and-holds 602 and 619, respectively, resulting in the presentation of signals 603 and 620 to MUX 604. MUX 604 serially conveys signals 603 and 620 via signal 606 line to flash analog-to-digital converter 605 in response to receiving address signals 607 generated by processor 610. The digitized representations of signals 620 and 603 are received by processor 610, via data bus 614, divides the value of signal 603 by the value of signal 620 to produce a normalized value representing the data stored by photodiode number "1" in photodiode array 28. This normalized value is provided by processor 610 via data bus 615a to be stored in RAM 615.

Trigger signal 13 is preferably generated only once for each cycle of the transfer of all data stored in photodiode array 28, typically within the countdown period after the shift signal 640a having a "0" index is generated. Track-and-hold 602 presents signal 603 to MUX 604 in response to receiving hold signal 613a. This process is repeated for each data stored in the cells 199 until all of the digitized representations of data stored in photodiode array 28 are normalized by processor 610 and stored in the RAM 615. Control of processor 610 is effected by instructions stored in ROM 616 and conveyed to processor 610 via data bus 616b.

After all of the digital representations of data stored in photodiode array 28 has been normalized and stored in RAM 615, processor 610 generates a reset signal 640 which causes photodiode array 28 to store whatever optical information it is presently detecting.

Processor 610 also controls when data is to be stored by photodiode array 28 because it is desirable to process data detected only at specific times (referred to as the "data sample mode") in the duty cycle of flashlamp 548 such that the difference between signals 29a and 29c is maximized. Maximizing the difference between these signals has the benefit of enhancing the resolution of the photodetecting system comprised of photodetecting circuits 25 and 25b, and data processing circuit 38a.

Control of the data sample mode may be effected by providing signal 618 as one input to window comparator 70. The other input to window comparator 70 is a reference voltage provided by digital-to-analog converter 641. D/A converter 641 generates an analog output voltage signal 642 at a reference voltage, $V_{Ref}$, that is compared with signal 618 by comparator 70. When the difference between signals 618 and 642 is within a predetermined interval, the output signal 71 of comparator 70 becomes a logic "high." When processor 610 detects signal 71 as a logic "high", processor 610 goes into the data sample mode by generating the series of shift signals 640a, reset signal 640, and the series of signals 611, as described above so that data stored in photodiode array 28 and provided by photodiode 28b are stored and processed by processor 610.

The output signal 642 has a value of $V_{Ref}$, only when the voltage level of signal 618, $V_{618}$, is between certain voltage limits which may be in accordance with the relation: $V_{wc} < V_{618} < V_{wo}$, where $V_{wc}$ represents a reference voltage for which the window voltage closes, and $V_{wo}$ represents the reference for which the window opens. The values for $V_{wo}$ and $V_{wc}$ are provided by processor 610 to D/A converter 641 via data bus 643, and may be determined empirically by trial and error. The values of $V_{wo}$ and $V_{wc}$ may be input into processor 610 by means well known by those skilled in the art. However, it is to be understood that there may be applications of the invention where is desirable for the output of digital-to-analog converter 641 to be $V_{Ref}$ when $V_{wc} > V_{618} > V_{wo}$.

Figure 14:
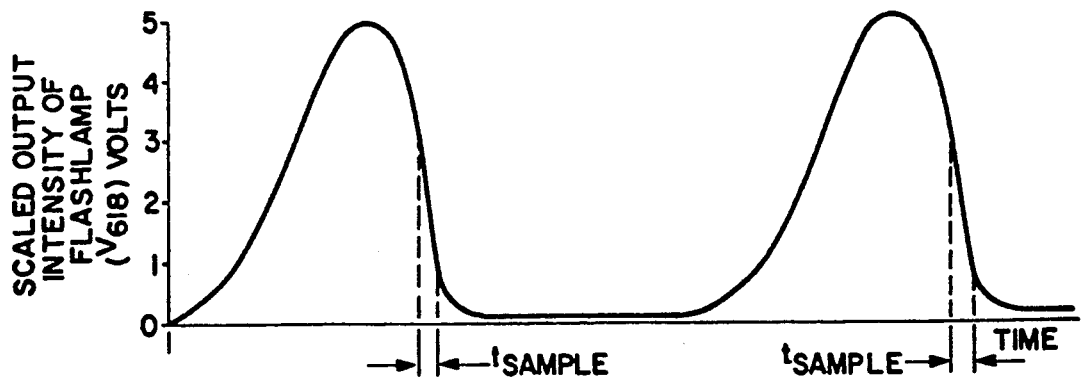
FIG. 14 is graph qualitatively illustrating the scaled output intensity of the flashlamp of FIG. 7 as a function of time.
Figure 15:
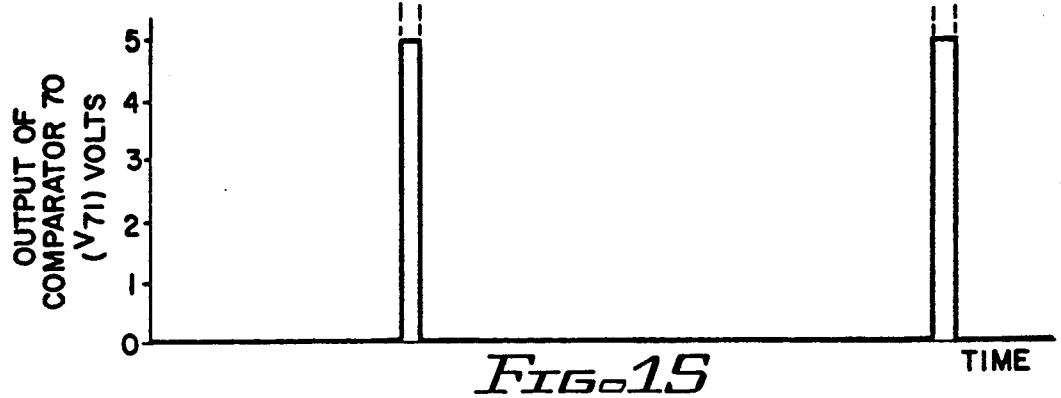
FIG. 15 is a graph qualitatively illustrating the amplitude of the interrupt signal 71 of data processing circuit 38a as a function of time.
Figure 17:
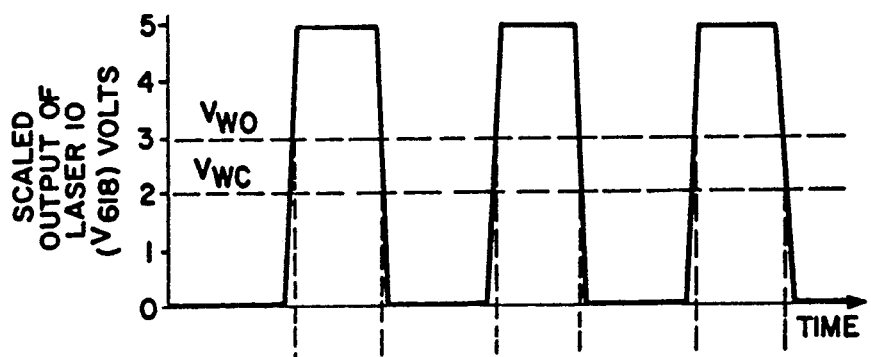
FIG. 17 is a graph qualitatively illustrating the scaled output of the laser of FIG. 1.

By way of example, the output of flashlamp 548 may be qualitatively represented by signal 618 and scaled from 0–5 volts, as previously discussed, and as graphically presented in FIG. 14. For purposes of illustration, and by way of example only, $V_{wo}$ may be 3V and $V_{wc}$ may be 1V. In such case, the output signal 642 may be equal to the reference voltage, $V_{Ref}$ during the sample intervals, $t_{sample}$. In such case, TTL signal 71 is a series of pulses preferably having a voltage level, $V_{71}$, of 5V during each sample interval, $t_{sample}$, as shown in FIG. 15. Thus, it can be appreciated that data processing circuit 38a controls the retrieval and processing of data generated by photodetecting circuits 25 and 25b within specific time intervals during the duty cycle of flashlamp 548.

Signal 71 is an interrupt signal. Therefore, whenever signal 71 is a logic "high," processor 610 operates in a data sample mode. During the intervals when signal 71 is a logic "low," processor 610 may perform other functions, as for example, processing the data obtained during the data sample mode to determine a scan speed value and generate a corresponding scan speed control output 622. Details regarding the processing of data stored in RAM 615 are set forth further herein. The output signal 622 of processor 610 is a scan speed control signal which is provided to data processor 40 as described herein above.

Referring to FIGS. 9A and 9B, flashlamp 548 is preferably a broadband xenon flashlamp mounted in housing 512 which generates incoherent light having wavelengths components that may range from about 170 nm–5000 nm. Housing 512 include upper housing 550 attached to lower housing 552 by fasteners 554. Housing 512 may be fabricated from black, hard anodized aluminum. Gasket 556 is interposed between upper and lower housings 550 and 552 to keep moist air from penetrating chamber 551 in upper housing 550. Electrical connectors 567 at the ends of optical energy source 514 are supported in and extend through apertures 562 in walls 563 of lower housing 552. Flashlamp 548 is positioned within fused quartz water jacket 551 mounted between walls 563 of lower housing 552. The position of flashlamp 548 is maintained by "0"-ring compression fittings 558 that fit over electrical connectors 567a and 567b, and are fastened to walls 563 by threaded fasteners, not shown. "0"-rings 559 interposed between compression fittings 558 and walls 563 provided a water tight seal therebetween. By way of example, reflector 516 may have an elliptical cross-section as shown in FIG. 9B, having a major axis of 7.00 cm, a minor axis of 2.80 cm, and a length of about 15.00 cm. In such case, the longitudinal axis of flashlamp 548 is generally coincident with a focus of reflector 516. However, it is to be understood that the cross-section of reflector 516 may be shaped in a variety of ways, preferably for example, as a keyhole or cusp.

Referring to FIG. 9A, access to flashlamp 548 is obtained through removable access plates 570 and 572 releasably mounted to lower housing 552 by means, not shown, as would be known by those skilled in the art. "0"-ring 571 provides a watertight seal between access plate 570 and lower housing 552. Likewise, "0"-ring 573 provides a watertight seal between access plate 572 and lower housing 552.

Electrical power to energize flashlamp 548 is conventionally provided by high voltage coaxial cable 579 that penetrates upper housing 550 through cable fitting 568 and includes center conductor 566a and braided conductor strap 566b. Center conductor 566 is conventionally connected to high voltage terminal post 569a with a lug 565 soldered or brazed to the center conductor. Terminal post 569a is electrically connected to flashlamp 548 via braided cable 575a brazed to high voltage electrical connector 567a. Electrical return is provided by braided cable 575b brazed or soldered to low voltage electrical connector 576b and to terminal post 569b. The end of braided conductor strap 566b is terminated with lug 565b which is connected to terminal post 569b.

Flashlamp 548 may be removed from lower housing 552 as follows: First, electrical power must be disconnected from housing 512. Then, quick connect fittings 555 are disconnected from inlet and outlet tubes 544 and 546, respectively. Fasteners 554 are removed from stations 557 connected to lower housing 552 so that the lower housing may be separated from upper housing 550. Then, access plates 570 and 572 are removed from lower housing 552. Braided cables 575a and 575b are unbolted from terminal posts 569a and 569b, respectively. Compression fittings 558 are unfastened from walls 563 and slipped out over their respective braided cables 575a and 575b. Then, flashlamp 548 may be carefully slipped out of water jacket 547 through either of apertures 562 and out of lower housing 552. Replacement of flashlamp 548 is accomplished by performing in reverse order, the steps recited above for removing the flashlamp.

Light generated by flashlamp 548 is emitted through quartz water jacket 551 and exits lower housing 552 through window 520 either directly, or by reflecting off of reflective surface 517 of reflector 516. Window 520 is preferably manufactured of fused quartz because such material has excellent transparency and high resistance to heat. Further, the transparency of quartz does not degrade from exposure to ultraviolet light. Gasket 581 is interposed between window 520 and window frame 580 so that the window is held in a watertight arrangement to lower housing 552 by bolts 582.

Flashlamp 548 and reflector 516 are preferably cooled with deionized water having a temperature, for example, of about 50° F. supplied at a rate of about 2 gpm from a water supply (not shown) to housing 512 through inlet tube 544 and returned through outlet tube 546. The deionized water preferably has an electrical resistance of at least 1 megohm. Inlet tube 544 penetrates upper housing 512 and is connected to manifold 574, mounted in lower housing 552, having multiple outlets 576 which penetrate reflector cavity 564 to distribute water over the length of flashlamp 548 and fill the reflector cavity. Water also penetrates the tapered ends 588 of quartz water jacket 551 to cool electrical connectors 567a and 567b, and flashlamp 548. Heat resulting from the generation of radiant energy from flashlamp 548 is absorbed by the water and transported out of chamber 564 through port 578 in fluid communication with outlet tube 546.

It is well known that in order to maximize the service life of a flashlamp, the operation of the flashlamp should be critically damped, that is, it should be operated with a dampening coefficient of about 0.77. Factors that determine the dampening coefficient of a flashlamp include: inductance of a single mesh pulse forming network ("PFN") typically employed in a flashlamp power circuit, capacitance, $\underline{C}$, of the PFN, arc length of the flashlamp, and operating voltage, $\underline{V}$, across the terminals of the flashlamp. The energy output, $\underline{E}$, of a flashlamp is characterized by the relation $E = \frac{1}{2}CV^2$. However, V should only be varied by no more than about $\pm$ 5 percent of the optimum voltage in order to maximize service life. Further, it is not practical to vary $\underline{C}$ because of the expense of additional capacitors required to implement such a circuit and because of the life limiting character of this type of circuit. Therefore, in order to maximize the useful life of flashlamp 548, it is preferably operated at a constant repetition rate with a fixed pulse width.

By way of example only, flashlamp 548 may be configured as having a transparent tube filled with xenon gas at a pressure of 60.0 KPa, an overall length of 28 cm, a 7 mm inside diameter, 9 mm outside diameter, and 15 cm arc length. This particular flashlamp is preferably operated at a repetition rate of 4-5 Hz with a full-width, half-maximum ("FWHM") fixed pulse width in the range of 1200-1800 microseconds and an input energy of about 100-120 joules/cm of arc length. As is characteristic, the useful output energy of a flashlamp available to irradiate the surface of structure 14 is approximately 20-25 per cent of the input energy to the flashlamp. The flashlamp is powered by a suitable power supply, not shown, as would be known by those of ordinary skill in the art.

Because flashlamp 548 is operated with a damping coefficient of about 0.77, the preferred method of controlling the energy density (joules/cm$^2$) at the surface of structure is to establish an appropriate distance between the flashlamp and the surface of the structure since the incident energy intensity at the surface of the structure is generally inversely proportional to the distance between the surface and the flashlamp. The energy flux (J/sec.) at the surface of the structure is preferably controlled by controlling the scan speed of the irradiating optical energy beam 549 across the surface of the structure. The distance between the flashlamp and the surface of structure 14 is more conveniently discussed with reference to the standoff distance, $\underline{d}$, between the surface of the structure and window 520, since the window and the flashlamp are a fixed distance apart.

Light power supply 11a may be of the type described in U.S. patent application Ser. No. 07/645,372, entitled "Ruggedized Flashlamp Exhibiting High Average Power and Long Life," by Richard G. Morton and William J. Connally, filed Jan. 24, 1991, and incorporated herein by reference.

Referring again to FIG. 7, the second embodiment also includes nozzle 60, particle stream source 64 and vacuum system 61 as described above.

The values for Threshold$_{min}$ and Threshold$_{max}$ may be determined empirically as described above with regard to Case 1 and Case 2 situations in conjunction with the first embodiment. However, in this case, the optical energy source is a flashlamp rather than a laser. The flashlamp may have a repetition rate of about 4-5 Hz and a constant duty cycle. The pulse width of the output of the flashlamp is preferably constant within the range of 200-2400 microseconds. A typical standoff distance between flashlamp 548 and the surface of the structure to be processed is typically 2.5 cm.

Figure 10A:
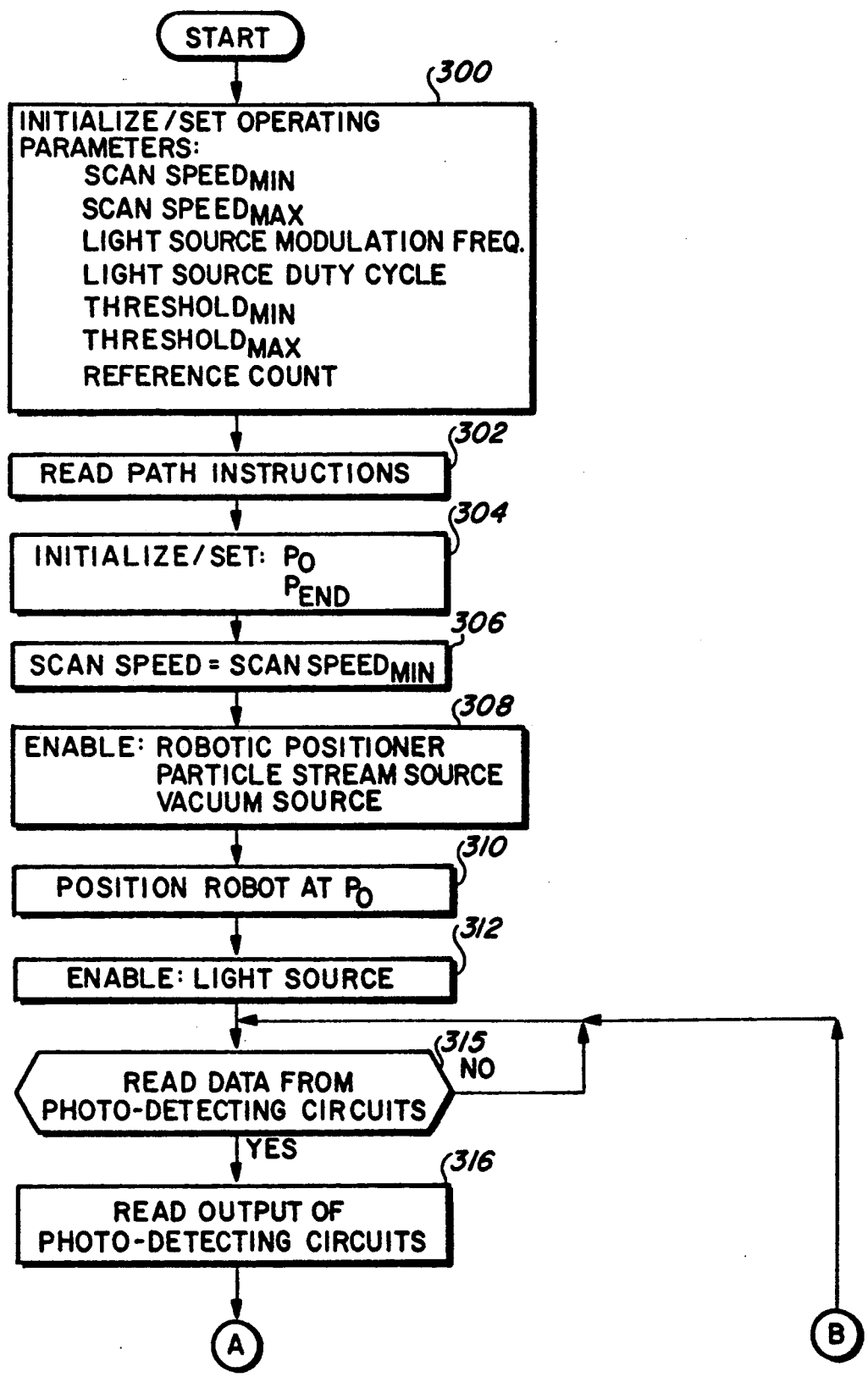
FIGS. 10A and 10B present a flow chart illustrating an example of a process for implementing the second embodiment of the system and method of the present invention.
Figure 10B:
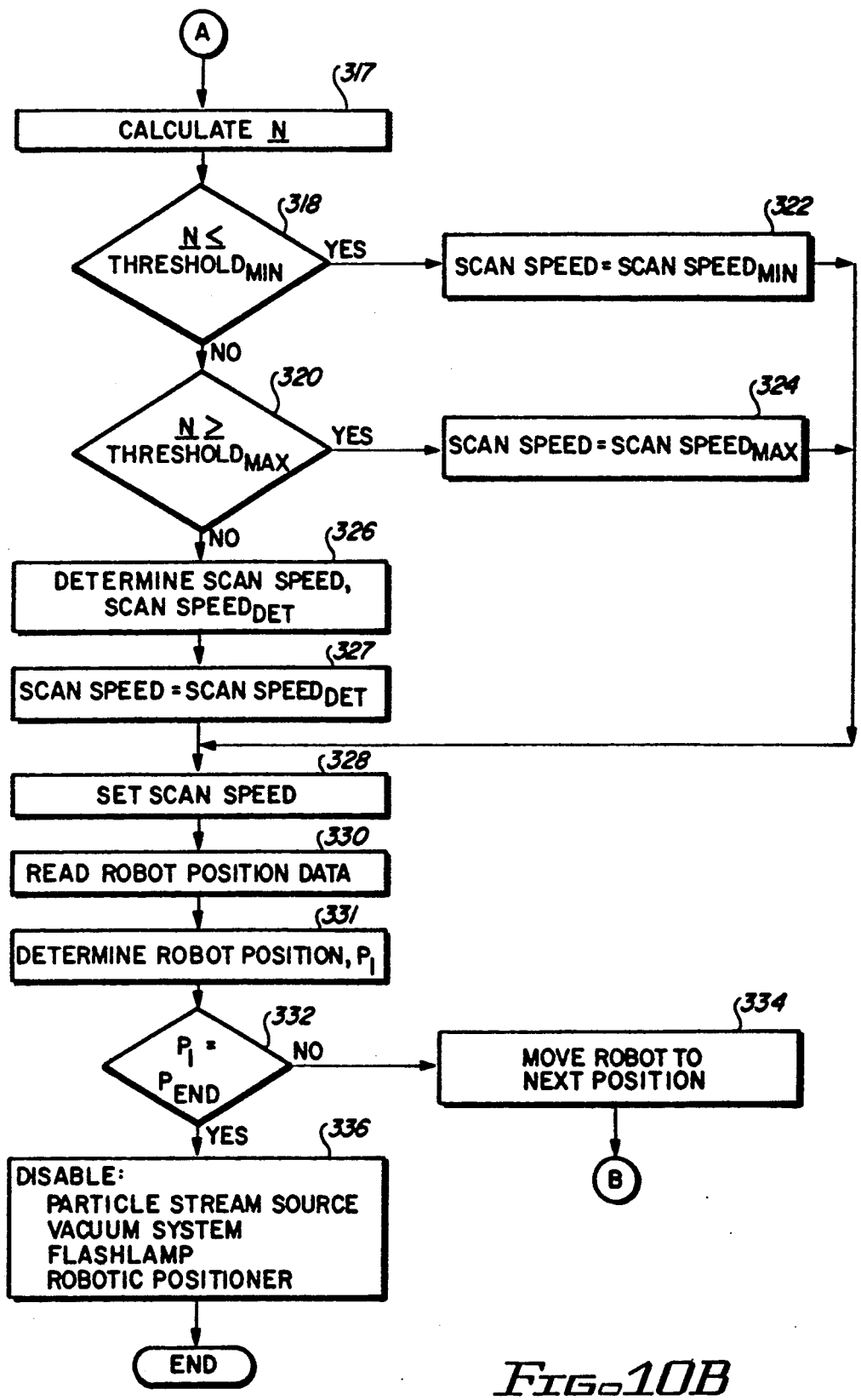

By way of example, the process and system of the present invention may be implemented as described below and presented in FIGS. 10A and 10B for a Case 1 type of application. As shown in FIGS. 10A and 10B, the operating parameters for the minimum and maximum scan speeds of robotic positioner 42 (Scan Speed$_{min}$, and Scan Speed$_{max}$, respectively), Threshold$_{min}$, and Threshold$_{max}$, and reference count are input into processor 610 at step 300. Also at step 300, the modulation frequency and duty cycle for flashlamp 548 are input into data processor 40. Path instructions are input into and read by data processor 40 at step 302. The path instructions define the predetermined path of robotic positioner 42. Then, based on the path instructions, values corresponding to the initial position, $P_o$, and the end position, $P_{end}$, of robotic positioner 42 at the ends of the predetermined path are set at step 304. Next, the initial scan speed of robotic positioner 42 is set equal to the minimum scan speed, Scan Speed$_{min}$ at step 306. Robotic positioner 42 and particle stream source 64 are enabled by data processor 40 at step 308. Then robotic positioner 42 is moved to its initial position, $P_o$ at step 310. At step 312, flashlamp 548 is enabled. As of step 314, flashlamp 548 outputs light beam 549 so as to irradiate and scan structure 14 at an appropriate location at a speed equal to Scan Speed$_{min}$. The system is now operational.

In response to being irradiated by flashlamp 548, ablating surface 22 generates spectral emissions 17 which are filtered by optical filter 26. Photodetector array 28 detects any filtered spectral emissions 27 and stores data representing the intensities of such spectral emissions 27 when the array receives a "reset" signal from data processing circuit 38a. Array 28 serially outputs signals 29a which are provided to data processing circuit 38a for analysis upon receipt of a series of "shift" signals from data processing circuit 38a. Photodetecting circuit 25b detects the intensity of the output of flashlamp 548 and provides a reference signal 29c to data processing circuit 38 that is used to normalize the value of signals 29a to eliminate effects of variations in the output intensity of the flashlamp 548.

Then processor 610 of data processing circuit 38a processes signals 29a and 29c as follows: At step 315, data processing circuit 38a determines whether to read the data detected by photodetecting circuits 25 and 25a, i.e., when interrupt signal 71 is "high". If the determination at step 315 is NO, then the process loops back to step 315. If the determination at step 315 is YES then the process proceeds to step 316, where data processing circuit 38a reads signals 29a and 29c so that they may be analyzed to determine an appropriate scan speed, as described below. Then processor 610 calculates $\underline{N}$, at step 317, where $\underline{N} = $ $$\frac{\sum_{i=1}^{m}\left(\frac{\text{Signal } 29a_i}{\text{Signal } 29c}\right)}{m} \quad (2)$$

and i represents a particular photodiode in photodiode array 28 and m represents the total number of photodiodes in array 28. As previously described, $\overline{N}$ represents the normalized average intensity of the optical data detected and stored in photodiode array 28.

At step 318, data processor 38a determines if $\overline{N}$ is equal to or less than a minimum threshold value, Threshold$_{min}$. If that determination is YES, then the process proceeds to step 322 where data processor 610 defines the value for the variable Scan Speed to be equal to the minimum scan speed, Scan Speed$_{min}$. If the determination at step 318 is NO, then data processor 610 determines if $\overline{N}$ is equal to or greater than the maximum threshold value, Threshold$_{max}$. If the determination at step 320 is YES, data processor 610 defines the scan speed to be equal to Scan Speed$_{max}$. If the determination at step 320 is NO, then at step 326, data processor 610 determines a value for the variable Scan Speed$_{det}$, which is functionally related to the value of $\overline{N}$ as previously described herein for a Case 1 application, and at step 327, sets Scan Speed equal to Scan Speed$_{det}$. Next, data processing circuit 38 provides a scan speed control output signal 39 to data processor 40. Data processor 40 then generates speed control signal 41b to robotic controller 44 at step 328 which directs robotic positioner 44 to move at the appropriate scan speed.

Next, data processor 40 reads data representative of the position of robotic positioner 42 at step 330 and determines the position of robotic positioner 42 at step 331, as described above with regard to the first embodiment of the present invention. After the position of robotic positioner 42 has been determined, a decision is made at step 332 as to whether the position, P$_l$, of robotic positioner 42 is the position at the end of the predetermined path, P$_{end}$, defined by the path instructions at step 302. If the determination at step 332 is YES, then the processing of structure 14 is complete, since flashlamp 548 has scanned the entire predetermined path. Then, at step 336, data processor 40 provides output signals to disable carbon dioxide pellet source 64, robotic controller 44 in order to disable robotic positioner 42, and flashlamp power supply 9 to disable flashlamp 548. However, if the determination at step 332 is NO, then flashlamp 548 has not scanned the entire predetermined path along structure 14, indicative that structure 14 has not been completely processed. In such case, the process loops back to step 316 and then continues as described above.

Figure 10C:
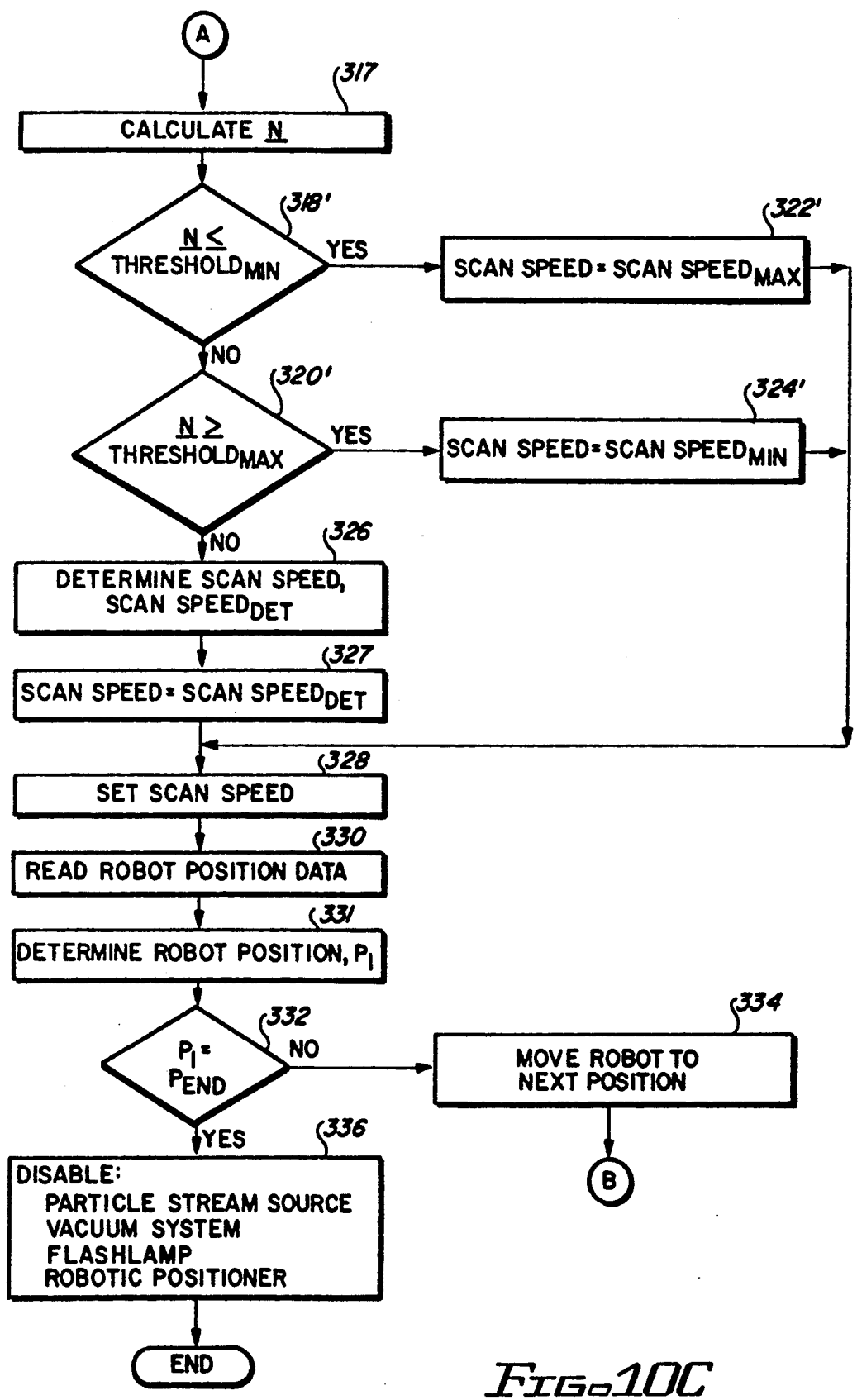

For a Case 2 type application, the invention may be implemented as described with reference to FIGS. 10A and 10C. Referring now to FIG. 10C, step 318', data processor 38a determines if $\overline{N}$ is equal to or less than a minimum threshold value, Threshold$_{min}$. If that determination is YES, then the process proceeds to step 322' where data processor 610 defines the value for the variable Scan Speed, to be equal to the maximum scan speed, Scan Speed$_{max}$. If the determination at step 318' is NO, at step 320', data processor 610 determines if the intensity of $\overline{N}$ is equal to or greater than the maximum threshold value, Threshold$_{max}$. If the determination at step 320' is YES, data processor 610 defines the scan speed to be equal to Scan Speed$_{min}$ at step 324'. If the determination at step 320' is NO, then at step 326, data processor 610 determines a value for the variable Scan Speed, which is functionally related to the value of $\overline{N}$ as previously described herein for a Case 2 application. After either of steps 322' or 324', the process continues at step 315. Otherwise, the process is identical to the process described for a Case 1 situation.

Third Embodiment of the Present Invention

A third embodiment of the present invention provides a system and method for removing material from a structure and may also be used to expose the surface of a specific layer of a multilayered structure without damaging the surface of such specific layer. The third embodiment employs a flashlamp to generate a pulsed light beam which scans and irradiates the surface of the structure, causing it to ablate. In between pulses of the flashlamp, the irradiated surface is further irradiated by a laser beam pulse which also causes the surface to ablate. Spectral emissions caused by the laser beam pulse induced ablation are detected and analyzed to determine an appropriate scan speed of the light source.

Material is removed from the structure primarily as a result of ablation resulting from irradiation by the flashlamp light source. One advantage of the flashlamp is that it is relatively inexpensive to operate in comparison to a laser of equal power. However, the flashlamp light source may generate spectral emissions having the same wavelengths as the spectral emissions associated with ablation of material from the structure. In such case, photodetecting circuit 25 would have no way of distinguishing spectral emissions generated by both the flashlamp and the ablating materials. Therefore, the laser is employed to sample the structure and generate spectral emissions attributable only to the structure.

The third embodiment is represented in block diagram form in FIG. 11. The system described in FIG. 11 is generally the same as described with reference to FIG. 7 except that the system represented in FIG. 11 further includes laser 10 for irradiating structure 14 with pulses of laser energy 12, laser power supply 11, and photodetecting circuit 25a in place of photodetecting circuit 25b. Features depicted in FIG. 11 that are common to like referenced features depicted in FIGS. 1 and 7 function as previously described. Laser 10 is controlled in accordance with control signal 41f generated by data processing circuit 38a which is provided to conventional laser power supply 11. In response to receiving signal 41f, laser power supply 11 generates and provides laser power supply control signal 41g to laser 10.

Laser 10 preferably generates pulsed laser beam 12', directed to further irradiate surface 22 of structure 14 with a single, narrow band, coherent pulse during predetermined intervals of the duty cycle of flashlamp 548 which may coincide with the periodic intervals when the output of flashlamp 548 is at or near a minimum, as shown in FIG. 12A.

In response to being irradiated by light beam 548, the material at surface 22 ablates and forms a plume of vaporized material (not shown) which generates spectral emission signals 17 having certain wavelengths and intensities, as previously described above. Irradiation of structure 14 by laser beam 20 also causes the material at surface 22 to ablate and generate spectral emission signals 17. However, the purpose of ablating structure 14 with light beam 549 is to remove material from the surface of the structure, whereas the purpose of the laser beam 12' is to ablate material at the surface of the structure so that such ablating material generates spectral emissions which can be detected without interference from the spectral output of the flashlamp.

One or more selected (signature) wavelengths associated with ablation of the material comprising the layer to be exposed may be used to determine the ablation or non-ablation of a particular layer of material, as previously described above. However, since flashlamp 548 is preferably a broadband light source, it may also generate optical energy having such signature wavelength components. To overcome this problem, the invention includes means for determining an appropriate scan speed based on the intensity of spectral emissions generated by the ablating material when the intensity or amplitude of the output of flashlamp 548 is at or near a relative minimum.

Because lasers have narrow band, coherent outputs, laser 10 is preferably selected so that wavelengths associated with laser beam 12' are distinguishable from the signature wavelengths desired to be detected from light signal 27. Thus, it can be appreciated that the purpose of laser 10 is to stimulate ablation at surface 22 so that if spectral emissions having signature wavelengths are generated, they are attributable solely to ablation of the irradiated material and not to the output of flashlamp 548. Again, ablation caused by laser 10 is not intended to be the primary method of removing material from the surface of structure 14.

Referring again to FIG. 11, laser beam 12' is sampled, as for example, by transecting laser beam 12' with beam splitter 11 which provides sample beam 20' to photodetecting circuit 25a comprised of narrow bandpass optical filter 26b and photodiode 28b. Optical filter 26b is selected to be transparent to a very narrow bandwidth of optical energy that includes the wavelength of laser beam 20'. The output of photodetecting circuit 25a is signal 29b which is provided to data processing circuit 38a.

Figure 16:
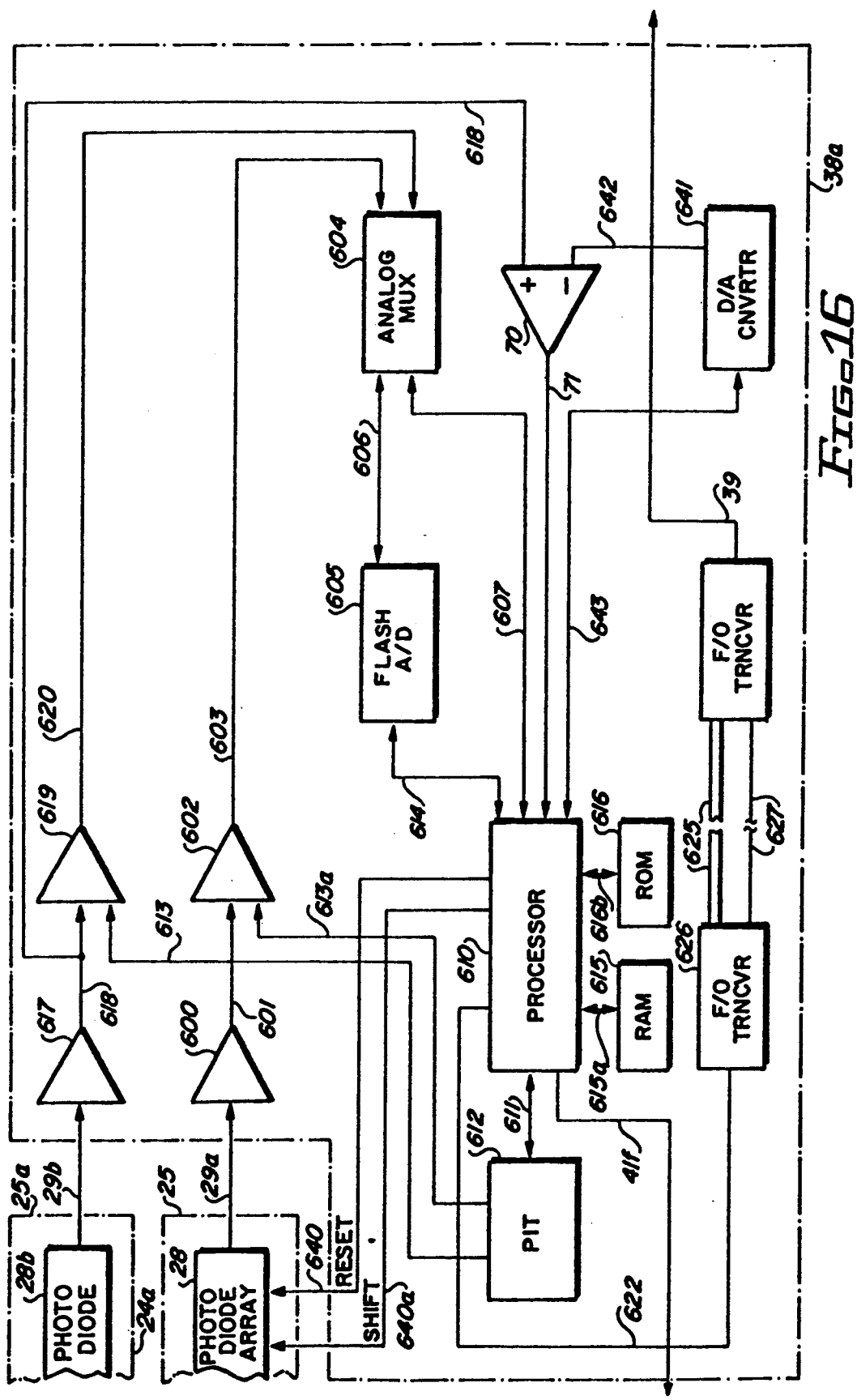
FIG. 16 is a block diagram of the data processing circuit 38a of FIG. 11, including laser control output signal 41f.

Data processing circuit 38a generally operates as previously described with reference to FIG. 8, except as noted below. The data sample period, $t_{sample}$, is preferably controlled to occur when the output of flashlamp 548 is at or near a minimum, by selecting appropriate values of $V_{wo}$ and $V_{wc}$ for the operating parameters of window comparator 641, as shown in FIGS. 12A and 12B. Further, when processor 610 is in a data sample mode, processor 610 generates output signal 41f, which as shown in FIG. 16, directs laser power supply 11 to control laser 10 so that the laser preferably generates a single laser pulse, as shown in FIG. 12C. Preferably, the period of $t_{sample}$ should be approximately equal to the pulse width of laser beam 12' so that data is sampled and recorded that represents spectral emissions generated by laser beam 12'.

The values for Threshold$_{Min}$, Threshold$_{Max}$ Scan Speed$_{min}$ and Scan Speed$_{max}$ may be generally determined as previously set forth above with regard to the first embodiment for both Case 1 and Case 2 situations, except as noted below. By way of example only, a number of test scans may be performed using pulse wave modulated flashlamp 548 to irradiate and ablate material at the surface of fresh sample structures representative of the structure that is to be processed.

The modulation frequency of the light source is about 4–5 Hz, but the duty cycle may be varied, as for example, by using fixed pulse widths in the range of 1200–2400 microseconds. A typical standoff distance between flashlamp 548 and the surface of the structure to be processed may be typically 2.5 cm. During periodic data sample intervals when the output of flashlamp 548 is at or near a minimum intensity or amplitude, laser 10 irradiates and ablates the test samples to stimulate the generation of spectral emissions from the ablating material which are represented by data signals 29a.

Throughout these tests, robotic positioner 42 is enabled so that the pulsed optical energy beam 549 of flashlamp 548 irradiates and scans the several test samples at different speeds. The filtered spectral emission signals 27 generated by the ablating material are monitored by photodetecting circuit 25 which generates signal 29a. As previously described with regard to the first embodiment, photodetecting circuit 25a detects the output of laser 10 and generates reference optical signal 29b which is also provided to data processing circuit 38a. Signals 29a and 29b are recorded by data processing circuit 38a, in accordance with techniques previously described for subsequent analysis.

With regard to a Case 1 type of application of the invention, an operator may identify one test sample out of all of the test samples having the most material removed, but still having an acceptable surface finish based on appropriate acceptance criteria as described above. A suitable percentage of the value N associated with this test sample may be used to establish the minimum threshold value, such as 80–95% for a Case 1 application, where $\underline{N} =$ $$\underline{N} = \frac{\sum_{i=1}^{m} \left( \frac{\text{Signal } 29a_i}{\text{Signal } 29b} \right)}{m} \tag{1}$$

and, i represents a particular photodiode in photodiode array 28 and $\underline{m}$ represents the number of photodiodes in array 28. Again, $\underline{N}$ represents the normalized average intensity of the optical data detected and stored in photodiode array 28.

The maximum threshold value, Threshold$_{max}$ is obtained by identifying the test sample having the least amount of material removed, but still having an acceptable finish. This latter test sample is referred to as the "second selected test sample." A substantial percentage of the value of $\underline{N}$ associated with the second selected test sample may be established as Threshold$_{max}$. Such substantial percentage may be about 80–95%. The minimum and maximum scan speeds for a Case 1 situation are the scan speeds associated with the minimum and maximum threshold values. However, for a Case 2 type of application, the minimum threshold value is associated with the maximum speed value, and the maximum threshold value is associated with minimum threshold value, where the scan speed is functionally related to the scan speed by a decreasing function.

An example of the operation of the method and system of the second embodiment of the present invention for a Case 1 type of application may be more fully appreciated with reference to the flowchart presented in FIGS. 13A and 13B, and the discussion below.

The operating parameters for the minimum and maximum scan speeds of robotic positioner 42 (Scan Speed$_{min}$ and Scan Speed$_{max}$, respectively), Threshold$_{min}$, and Threshold$_{max}$, are input into processor 610 at step 400. Further, the modulation frequency and duty cycle for flashlamp 548 are input into data processor 40. Path instructions are input into and read by data processor 40 at step 402. The path instructions define the predetermined path of robotic positioner 42. Then, based on the path instructions, values corresponding to the initial position, $P_o$, and the end position, $P_{end}$, of robotic positioner 42 are set at step 404. Next, the initial scan speed of robotic positioner 42 is set equal to Scan Speed$_{min}$ at step 406. Robotic positioner 42 and particle stream source 64 are enabled at step 408. At step 410, robotic positioner 42 is moved to its initial position, $P_o$, at the beginning of the predetermined path. At step 412, flashlamp 548 and particle stream source 414 are enabled by data processor 40. At this stage, the system is operational, whereby flashlamp 548 irradiates and scans the surface of structure 14 with light beam 549, commencing at location $P_o$ and at a speed equal to Scan Speed$_{min}$, and data processor 38a is disposed to analyze data encoded in signals 29a and 29b for determining and generating appropriate scan speed control output signals 39. Laser 10 irradiates the surface of structure 14 with single pulses of periodic intervals as previously described, while flashlamp 548 is enabled.

Ablation of surface 22 by flashlamp 548 generates spectral emissions 17 which are monitored by photodetecting circuit 25. Photodetector array 28 detects the presence of any filtered spectral emission signals 27 having signature wavelengths that pass through filter 26 and generates output signals 29a which are provided to data processing circuit 38a. Processing circuit 38a also receives reference optical signal 29b.

At step 415, data processing circuit 38a determines whether to read data signals 29a and 29b by reading signal 71. If the determination at step 415 is NO, the process loops back to repeat step 415. If the determination at step 415 is YES, data processing circuit 38a reads data from photodetecting circuits 29a and 29b, in the previously discussed manner with regard to the second embodiment, where signal 29b substitutes for signal 29c. While data processing circuit 38a reads signals 29a and 29b, at step 417 data processing circuit 38a generates signal 41f which triggers laser power supply 11 to direct laser 10 to emit one pulse. Then data processing circuit 38a determines $\overline{N}$, related to data signals 29a and 29b, as previously discussed.

At step 418, data processor 610 determines if $\overline{N}$ is equal to or less than a minimum threshold value, Threshold$_{min}$. If that determination is YES, then the process proceeds to step 422 where data processor 40 defines the value for the variable Scan Speed, to be equal to the minimum scan speed, Scan Speed$_{min}$. If the determination at step 418 is NO, then at step 420, data processor 40 determines if $\overline{N}$ is equal to or greater than the maximum threshold value, Threshold$_{max}$. If the determination at step 420 is YES, data processor 610 defines the determined scan speed, Scan Speed$_{det}$, to be equal to Scan Speed$_{max}$. If the determination at step 420 is NO, then at step 426, data processor 610 determines a value for the variable, Scan Speed, as previously described herein, where the determined scan speed is related to $\overline{N}$ by an increasing function, as exemplified in FIG. 2A. Then at step 427, processor 610 sets the Scan Speed equal to Scan Speed$_{det}$.

At step 428, data processing circuit 38a generates a scan speed control output signal 39 that is provided to data processor 40. In response to receiving signal 39, processor 40 generates signal 41b which is provided to robotic controller 44 at step 428 which directs robotic positioner 44 to move at the appropriate scan speed.

Then, data processor 40 reads data representative of the position of robotic positioner 42 at step 430 and determines the position of robotic positioner 42 at step 431, in accordance with well known techniques. After the position of robotic positioner 42 has been determined, a decision is made at step 432 as to whether the position, $P_l$, of robotic positioner 42 is the position at the end of the predetermined path, $P_{end}$, defined by the path instructions at step 402. If the determination at step 432 is YES, then the processing of structure 14 is complete, since flashlamp 548 has scanned the entire predetermined path. Then, at step 436, data processor 40 provides output signals to disable particle stream source 64, robotic controller 44 in order to disable robotic positioner 42, and flashlamp power supply 9 to disable flashlamp 548. However, if the determination at step 432 is NO, then flashlamp 548 has not scanned the entire predetermined path along structure 14, indicative that structure 14 has not been completely processed. In such case, further path instructions are generated by processor 40 and provided to robotic controller 44, then the process loops back to step 413 and then continues as described above.

Figure 13A:
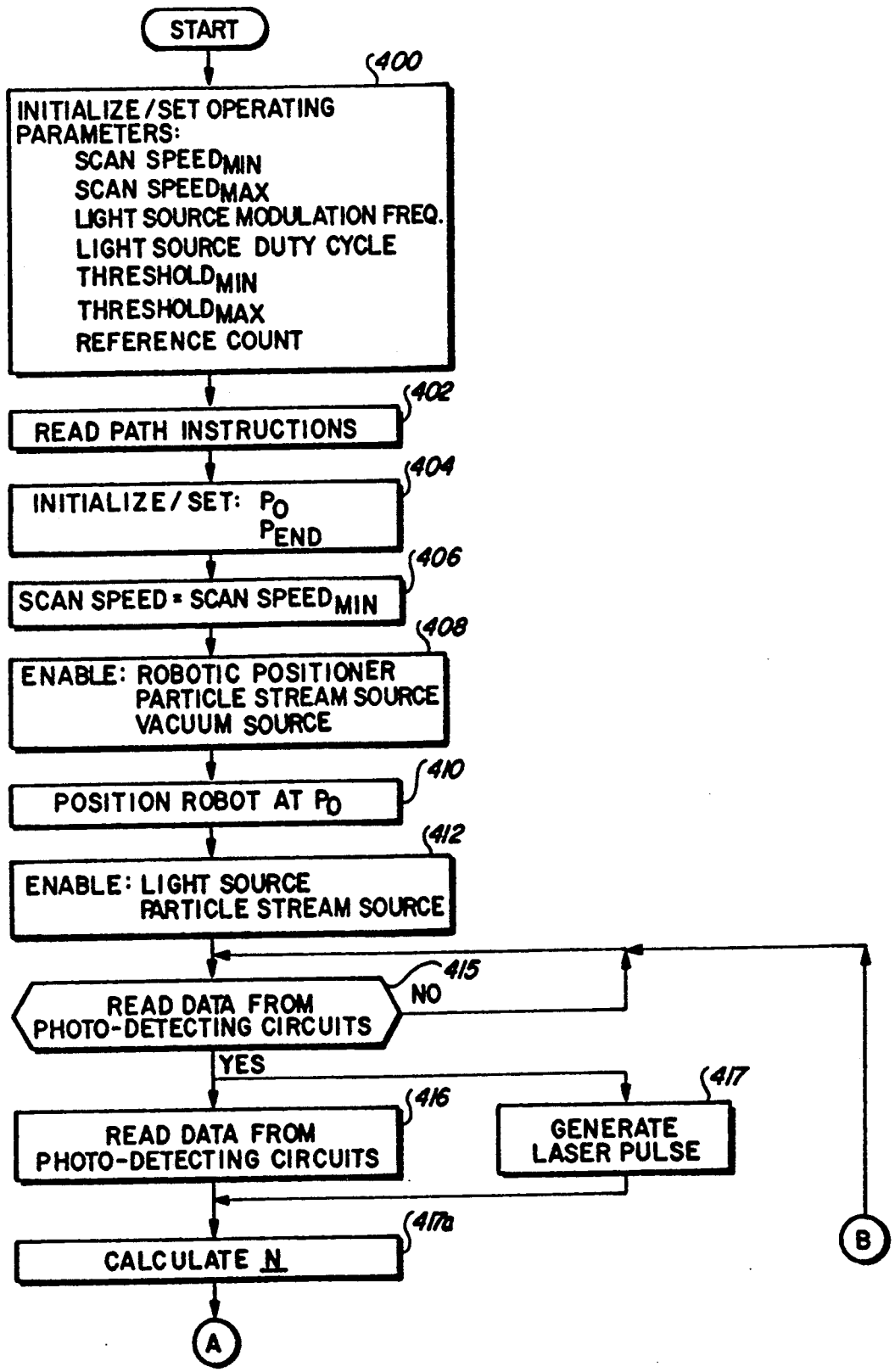
FIGS. 13A and 13B present a flowchart illustrating an example of a process for implementing the third embodiment of the invention.
Figure 13B:
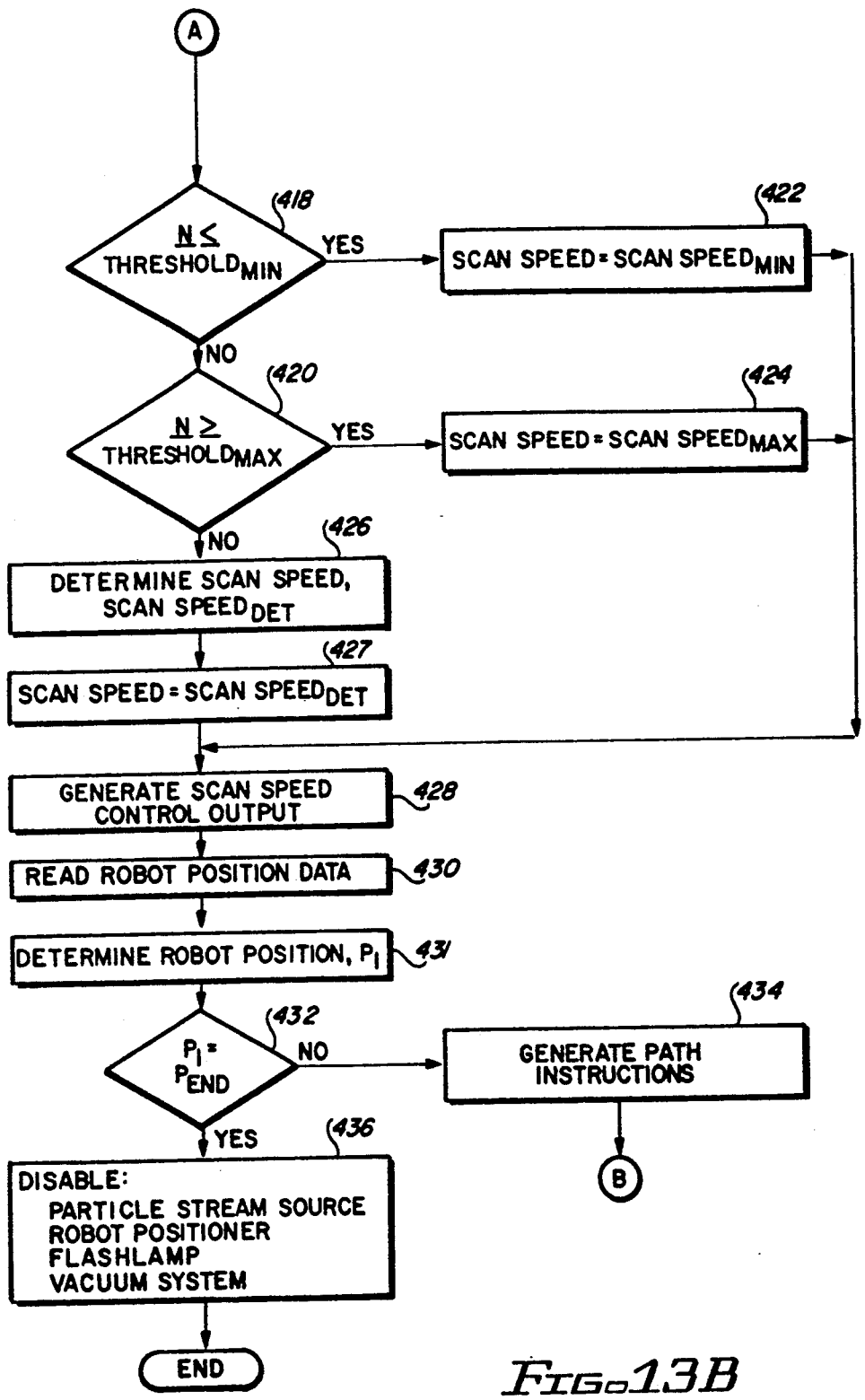
Figure 13C:
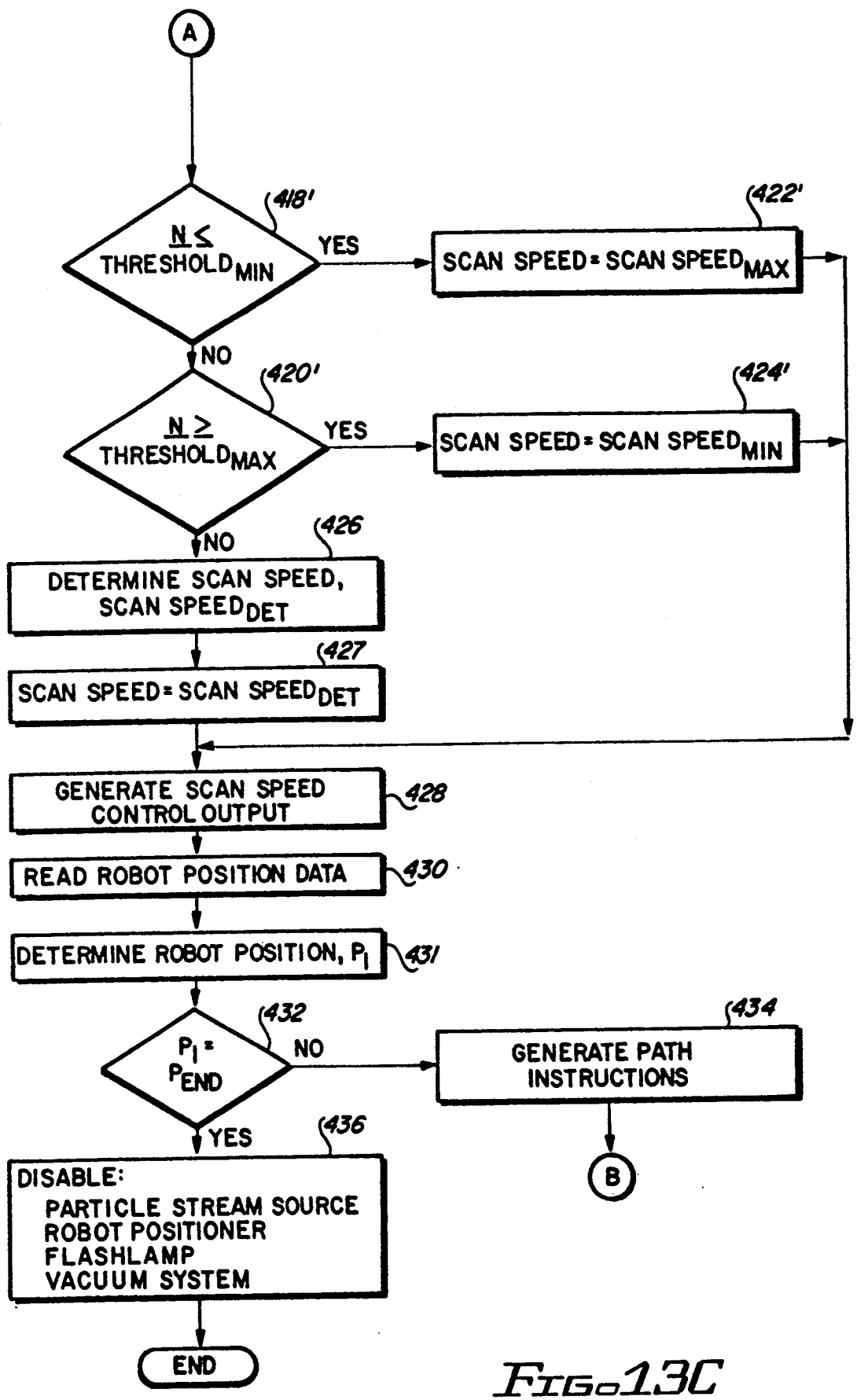

The general process described with regard to FIGS. 13A and 13B may also be implemented where the scan speed is related to $\overline{N}$ by a decreasing function as shown in FIG. 2B. Referring to FIG. 13C, a determination is made by processor 610 at 418' as to whether $\overline{N} \leq$ threshold$_{Min}$. If the decision at 418' is YES, then the value of Scan Speed is set equal to Scan Speed$_{Max}$ at step 422'. If the decision at step 418' is NO, the decision is made at step 420' as to whether $\overline{N} \geq$ threshold$_{Max}$. If the decision is YES, at 424', the value of Scan Speed is set equal to Scan Speed$_{Min}$ at step 424'. After either of steps 422' or 424', the process loops back to step 415. Otherwise, the process continues to step 426, where Scan Speed$_{det}$ is determined where the value of the determined scan speed is related to $\overline{N}$ by a decreasing function as shown in FIG. 2B.

While the present invention has been described in terms of preferred embodiments, it is to be understood that the invention is not to be limited to the exact form of the apparatus or processes disclosed. Therefore, it is to be understood that the invention may be practices other than as specifically described without departing from the scope of the claims.

That which is claimed:

1. A method for removing material from a structure, comprising the steps of:
    (1) generating a light beam;
    (2) irradiating the surface material of a structure with said light beam having an intensity sufficient to ablate said surface material and to cause said surface material to generate spectral emission signals;
    (3) scanning said structure with said light beam at a scan speed;
    (4) monitoring said spectral emissions to detect a selected one of said spectral emission signals having an intensity and a selected wavelength and generating an electronic output signal representative of the intensity of a selected one of said spectral emission signals in response to detecting said selected one of said spectral emission signals;
    (5) determining an updated scan speed functionally related to said electronic output signal; and
    (6) directing said scan speed to be equal to said updated scan speed.

2. The method of claim 1 wherein the step of generating includes generating a pulsed light beam.

3. The method of claim 2 wherein the step of generating includes generating a broad-band incoherent pulsed light beam.

4. The method of claim 3 wherein the step of generating further includes generating said light beam having spectral components having wavelengths that may range from 170 to 5000 nanometers.

5. The method of claim 2 wherein the step of determining said scan speed includes:
relating said updated scan speed to the value of said electronic output signal by an increasing function.

6. The method of claim 5 wherein in the step of generating said light beam includes generating said light beam having component wavelengths that are different from said selected wavelength.

7. The method of claim 5 further including the step of cooling said structure.

8. The method of claim 7 including cooling and cleaning said structure by impinging a particle stream on said surface material.

9. The method of claim 8 including impinging said surface with carbon dioxide pellets entrained in a dry gas stream.

10. The method of claim 2 wherein the step of determining said scan speed includes:
relating said updated scan speed to said electronic output signal by a decreasing function.

11. The method of claim 10 wherein in the step of generating said light beam includes generating said light beam having component wavelengths that are different from said selected wavelength.

12. The method of claim 10 further including the step of cooling said structure.

13. The method of claim 12 including cooling and cleaning said structure by impinging a particle stream on said surface material.

14. The method of claim 13 including impinging said surface with carbon dioxide pellets entrained in a dry gas stream.

15. The method of claim 14 wherein the step of generating includes generating a broad-based pulsed light beam.

16. The method of claim 14 wherein the step of generating includes generating a coherent pulsed light beam with a laser.

17. The method of claim 16 wherein the step of determining said scan speed includes:
relating said updated scan speed to the value of said electronic output signal by an increasing function.

18. The method of claim 17 wherein in the step of generating said light beam includes generating said light beam having component wavelengths that are different from said selected wavelength.

19. The method of claim 17 further including the step of cooling said structure.

20. The method of claim 19 including cooling and cleaning said structure by impinging a particle stream on said surface material.

21. The method of claim 20 including impinging said surface with carbon dioxide pellets entrained in a dry gas stream.

22. The method of claim 16 wherein the step of determining said scan speed includes:
relating said updated scan speed to said electronic output signal by a decreasing function.

23. The method of claim 22 wherein in the step of generating said light beam includes generating said light beam having component wavelengths that are different from said selected wavelength.

24. The method of claim 22 further including the step of cooling said structure.

25. The method of claim 24 including cooling and cleaning said structure by impinging a particle stream on said surface material.

26. The method of claim 25 including impinging said surface with carbon dioxide pellets entrained in a dry gas stream.

27. A method for removing material from a structure, comprising the steps of:
(1) generating a pulsed light beam having a pulse period;
(2) irradiating the surface material of a structure with said pulsed light beam at an intensity sufficient to ablate said surface material and to cause said ablating surface material to generate spectral emission signals having intensities;
(3) scanning the structure with the light beam;
(4) monitoring said spectral emissions to detect a selected one of said spectral emission signals having a selected wavelength and generating electronic output signals representative of the intensity of said selected one of said spectral emission signals in response to detecting said selected one of said spectral emissions signals;
(5) determining an updated scan speed functionally related to said electronic output signals generated during a predetermined interval of said pulse period of said light beam; and
(6) directing said scan speed to be equal to said updated scan speed.

28. The method of claim 27 wherein the step of determining said scan speed includes:
relating said updated scan speed to said electronic output signals by an increasing function.

29. The method of claim 28 wherein the step of determining said scan speed includes:
relating said updated scan speed to said electronic output signals by a decreasing function.

30. The method of claims 28 or 29 including generating said light beam with component wavelengths that are all different from said selected wavelength.

31. The method of claim 30 further including cooling and cleaning said irradiated surface material with a particle steam impinging said surface.

32. The method of claim 31 including cooling and cleaning said surface material by impinging a stream of carbon dioxide pellets entrained in dry gas on said surface material.

33. The method of claims 28 or 29 including generating said light beam with a flashlamp so as to produce an incoherent light beam.

34. The method of claim 33 wherein the step of generating includes generating said incoherent light having wavelength components that may be 170 to 5000 nanometers.

35. The method of claims 28 or 29 including generating said light beam with a laser so as to produce a coherent light beam.

36. A method for removing material from a structure, comprising the steps of:
(1) generating a pulsed and coherent light beam having a broadband output and a pulse period;

(2) irradiating the surface material of a structure at a target area with said pulsed light beam at an intensity sufficient to ablate said surface material;

(3) irradiating said target area of said structure with a laser pulse having an intensity sufficient to ablate said surface material so as to cause said surface material to generate spectral emission signals having intensities when a difference between said spectral characteristics of said light beam and said spectral emission signals is substantially at a maximum;

(4) scanning said structure with said light beam at a scan speed;

(5) monitoring said spectral emission signals to detect a selected one of said spectral emission signals having a selected wavelength, and generating electronic output signals representative of the intensity of said selected one of said spectral emission signals in response to detecting said selected one of said spectral emission signals;

(6) determining an updated scan speed functionally related to said electronic output signals generated during a predetermined interval of said pulse period; and (7) directing said scan speed to be equal to said updated scan speed.

37. The method of claim 36 wherein the step of determining said scan speed includes:
relating said updated scan speed to said electronic output signals by an increasing function.

38. The method of claim 37 wherein the step of determining said scan speed includes:
relating said updated scan speed to said electronic output signals by a decreasing function.

39. The method of claim 37 or 38 further including cooling and cleaning said structure with a particle stream impinging said structure.

40. The method of claim 39 including cooling and cleaning said structure by impinging a stream of carbon dioxide pellets on said structure.

41. The method of claim 40 including generating said light beam with a flashlamp.

42. A system for removing material from a structure, comprising:
an optical energy source for generating a pulsed light beam for irradiating the surface material of a structure with said a pulsed light beam having an intensity sufficient to ablate said surface material and to cause said ablated surface material to generate spectral emission signals having intensities;
scanning means supporting said optical energy source for scanning said structure with said light beam;
photodetecting means for monitoring said spectral emissions to detect a selected one of said spectral emission signals having a selected wavelength and for generating an electronic output signal functionally related to the intensity of said selected one of said spectral emission signals in response to detecting said selected one of said spectral emission signals; and
a data processor operably coupled to said photodetecting means and said scanning means for determining a scan speed functionally related to said electronic output signal and for directing said scanning means to transport said optical energy source at said scan speed so that said light beam scans said structure at said scan speed.

43. A system for removing material from a structure, comprising:
an optical energy source generating a pulsed, incoherent light beam for irradiating the surface material of a structure with said light beam having an intensity sufficient to ablate said surface material and to cause said ablated surface material to generate spectral emission signals having intensities, where said light beam has a pulse period;
scanning means for scanning said structure with said light beam;
photodetecting means for monitoring said spectral emissions to detect the intensity of a selected one of said spectral emission signals having a selected wavelength and generating electronic output signals representative of said selected one of said spectral emission signals in response to detecting said selected one of said spectral emissions signals; and
a data processor operably coupled to said photodetecting means and to said scanning means for determining a scan speed functionally related to said electronic output signals generated during a predetermined interval of said pulse period.

44. A system for removing material from a structure, comprising:
an optical energy source generating a pulsed, incoherent light beam having a pulse period for irradiating the surface material of a structure at a target area with said light beam having an intensity sufficient to ablate said surface material;
a laser generating a pulsed, coherent laser beam for irradiating said target area of said structure with said laser beam having an intensity sufficient to ablate said surface material so as to cause said surface material to generate spectral emission signals having intensities when said amplitude of said waveform of said light beam is approximately at said minimum amplitude;
scanning means supporting said incoherent optical energy means and said laser for scanning said structure with said incoherent light and laser beams;
photodetecting means mounted to said scanning means for monitoring said spectral emissions to detect a selected one of said spectral emission signals having a selected wavelength and generating an electronic output signal representative of the intensity of said selected one of said spectral emission signals in response to detecting said selected one of said spectral emission signals generated by said laser pulse;
a data processor operably coupled to said monitoring means and said scanning means for determining a scan speed functionally related to said electronic output signal generated during a predetermined interval of said pulse period.

* * * * *

UNITED STATES PATENT AND TRADEMARK OFFICE
CERTIFICATE OF CORRECTION

PATENT NO. : 5,204,517  
DATED : April 20, 1993  
INVENTOR(S) : Cates, et al

Page 1 of 2

It is certified that error appears in the above-indentified patent and that said Letters Patent is hereby corrected as shown below:

On the title page, Item [56] Reference Cited:

Under "Other Publications", second line, (Col. 1), change "1882" to --1982--. Under "Other Publications, line 5 & 6, (Col. 2), change "concerence" to --conference--. IN THE SPECIFICATION: Column 3, line 18, after "structure" add --, and--. Column 3, line 40, after "embodiment" insert --of the--. Column 4, line 54, add --.-- at the end of the sentence. Column 4, line 63, after "is" insert --a--. Column 6, line 17, after "be" delete --have--. Column 6, line 37, after "shift" insert --signal 640 is associated with an index value which is--. Column 6, line 40, replace "represent" with --represented--. Column 7, line 12, replace "has" with --have--. Column 9, line 46, delete ",". Column 10, line 64, after "surface" insert --of--. Column 12, line 52, after "positioner" change "44" to --42--. Column 14, line 13, change "service" to --surface--. Column 15, line 45, delete "have". Column 15, line 58, change "n" to --in--. Column 16, line 1, change "represent" to --represented--. Column 16, line 7, after "signals" insert --613--. Column 16, line 22, after "614" insert --which--. Column 16, line 34, change "199" to --1-99--. Column 16, line 41, change "has" to --have--. Column 17, line 15, after "where" insert --it--. Column 17, line 49, change "include" to --includes--.

UNITED STATES PATENT AND TRADEMARK OFFICE
CERTIFICATE OF CORRECTION

PATENT NO. : 5,204,517
DATED : April 20, 1993
INVENTOR(S) : Cates, et al

It is certified that error appears in the above-indentified patent and that said Letters Patent is hereby corrected as shown below:

Column 17, line 64, change "provided" to --provide--, and after "water" insert a hyphen. Column 19, line 45, after "structure" insert --14--. Column 20, line 7, change "200" to --1200--. Column 20, line 34, insert --part-- after "As". Column 23, line 56, insert --,-- after "$Threshold_{Max}$". Column 25, line 68, change "44" to --42--. Column 26, line 44, change "practices" to --practiced--. Column 27, line 30; column 27, line 53; and column 28, line 1: after "wherein" delete --in--. Column 29, line 46, after "said" delete --a--. Column 30, line 55, after ";" insert --and--.

Signed and Sealed this

Twenty-second Day of March, 1994

Attest:

BRUCE LEHMAN

*Attesting Officer*   *Commissioner of Patents and Trademarks*